Figure 1:
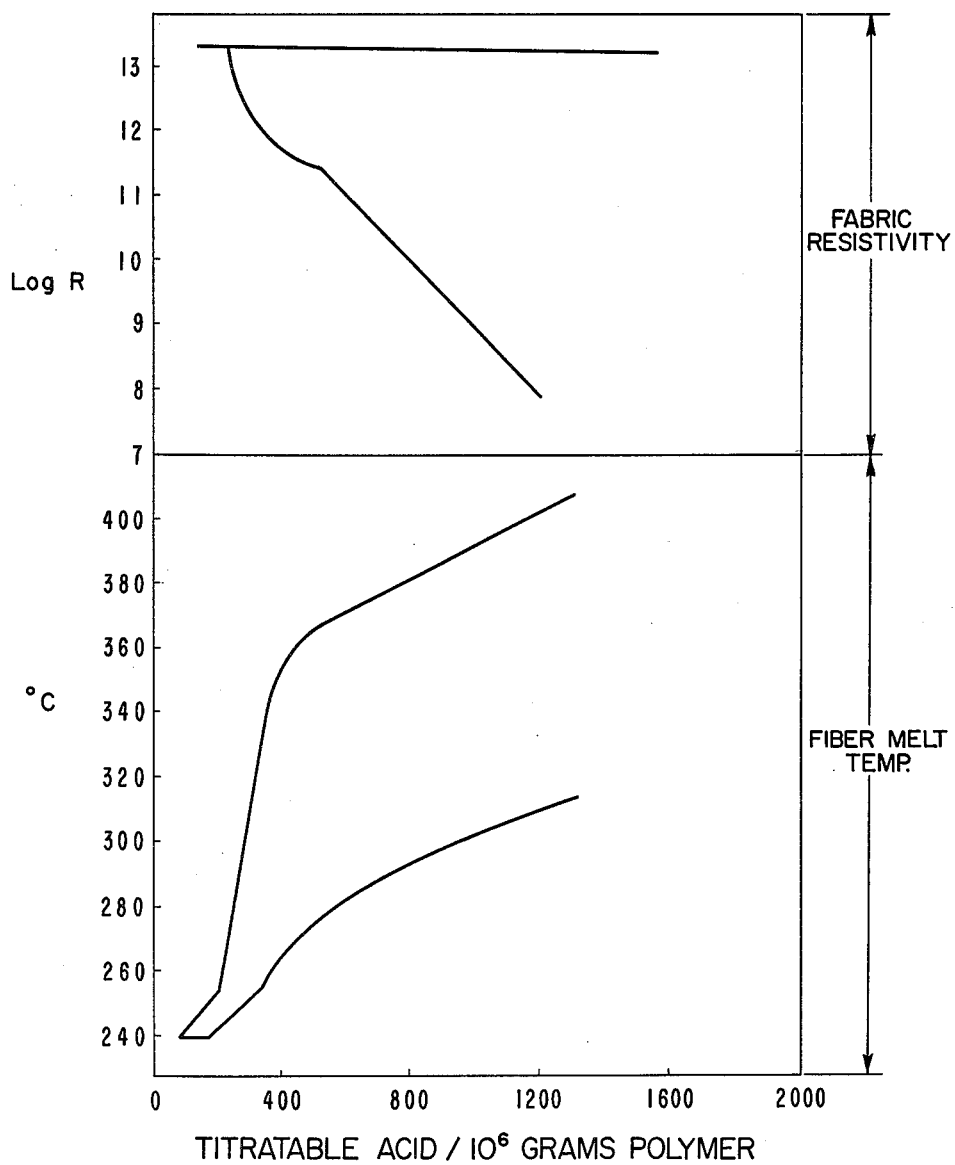

INVENTOR
DAVID TANNER
BY Carl A. Hechmer
ATTORNEY

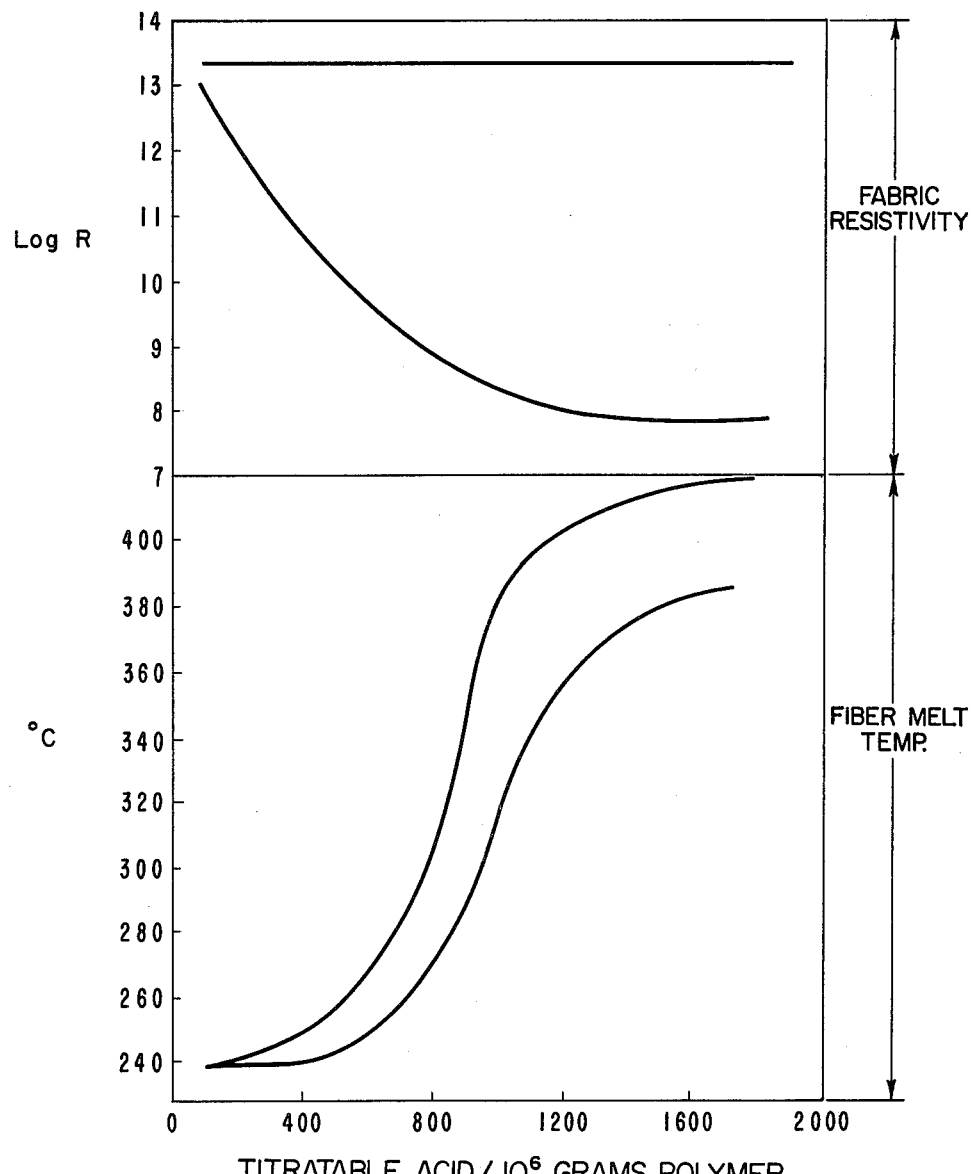

United States Patent Office  3,099,631
Patented July 30, 1963

3,099,631
NITROGENOUS CONDENSATION POLYMER
CONTAINING GRAFTED ACID
David Tanner, Wilmington, Del., assignor to E. I. du Pont
de Nemours and Company, Wilmington, Del., a corporation of Delaware
Filed Mar. 6, 1958, Ser. No. 719,659
20 Claims. (Cl. 260—2.5)

This invention relates to a novel product produced from certain condensation polymers. More particularly it concerns a novel product comprising an organic compound chemically grafted to a shaped article produced from a synthetic substantially linear nitrogenous condensation polymer.

Fibers spun from synthetic linear nitrogenous condensation polymers such as the polyamides have attained a high degree of success in the textile trade because of their outstanding properties, such as high tenacity, wear resistance, impact resistance, attractive handle and the like. Such fibers have been conventionally prepared by melt spinning techniques. The fact that these fibers are normally melt spun inherently limits their application in fields that require resistance to high temperatures. Furthermore, in some applications, such as in the manufacture of wearing apparel, their tendency to acquire and retain static charges is often undesirable.

OBJECTS

An object of the present invention is to provide a novel and useful shaped structure produced from a synthetic nitrogenous condensation polymer.

Another object is to provide a shaped structure produced from a synthetic nitrogenous condensation polymer retaining a high level of physical properties, and characterized by a high level of reactivity to aftertreatments.

A further object is to provide a melt resistant shaped structure produced from a synthetic nitrogenous condensation polymer.

A still further object is to provide a shaped structure of low static propensity and improved wet crease recovery, the said structure being formed from a synthetic nitrogenous condensation polymer.

These and other objects will become apparent in the course of the following specification and claims.

STATEMENT OF INVENTION

In accordance with the present invention a shaped structure formed from a graft copolymer is provided, the said structure comprising a high molecular weight, synthetic, substantially linear nitrogenous polymer characterized by recurring $$-\overset{|}{N}-$$

atoms as an intgeral part of the polymer chain, and bearing at least about 300 titratable acid groups per million grams of polymer, at least about 200 of the said acid groups being chemically bonded by a carbon-to-carbon linkage to a catenarian carbon of the said nitrogenous polymer, and the said acid groups so linked being at least one carbon atom removed from said catenarian carbon. A shaped structure of the acid-modified polymer in the form of its salt, i.e., a shaped structure of the salt of an acid-modified polymer, possesses higher resistance to heat and hole melting and in some instances, as explained more in detail hereinafter, a high degree of wet crease recovery and decreased propensity toward acquisition and retention of static charges than a structure produced from the corresponding unmodified synthetic linear polymer. The product of the present invention, therefore, encompasses a polymer with a plurality of acid groups which are chemically bonded to the main polymer chain, and which acid groups may be in the form of a salt. This salt may be formed on the surface or throughout the body of the shaped structure (such as a fiber) depending upon whether the acid to be grafted has diffused into or remains only upon the surface of the shaped structure. Some salts of the acid-modified polymer product possess properties which are somewhat characteristic of a cross-linked polymer. For example, the melting point of the shaped structure is increased above that of an unmodified polymer, as is its resistance to flash heat. Furthermore, in some cases, the salt of the acid-modified product becomes insoluble in some solvents which dissolve the unmodified polymer structure, while it remains soluble in other solvents. In addition, certain metallic ions in forming the salts of the acid-modified polymer confer anti-static properties on the shaped structures.

PROCESSES

The salt of the acid-modified shaped polymeric structure may be conveniently prepared by exposing the shaped structure of an acid-modified polyamide to a solution containing positive ions, whereby the ions become reversibly attached to the shaped structure. The shaped structure of acid-modified polymer may be prepared by intimately contacting a solid, synthetic, substantially linear polymer, e.g., a polyamide, with an organic acid possessing at least one group having non-aromatic unsaturation and subjecting the composition to bombardment by high energy particle or ionizing electromagnetic radiation. (Under certain circumstances, as explained in detail hereinafter, the exposure of the solid synthetic, substantially linear polymer to radiation may precede the contact with organic acid.) When the modifying unsaturated acid is homopolymerizable, the acid-modified polymer may be prepared by soaking a solid, synthetic, substantially linear polymer of the class defined hereinafter, with a solution of the acid and then inducing polymerizing in the presence of a vinyl polymerization catalyst at elevated temperature. After the acid-modulated solid is formed, it may be reshaped prior to treatment with cations. Alternatively, for some purposes, the salt of the acid-modified shaped polymeric structure may be prepared by contacting a solid synthetic, substantially linear nitrogenous polymer with the salt of an unsaturated organic acid and subjecting it to bombardment by high energy particle or ionizing electromagnetic radiation as described previously.

FIGURES

The figures, illustrative of the embodiment of the invention wherein the nitrogenous polmer is a polyamide, are curves plotting as ordinates on independent scales fiber melt temperature and the log to the base 10 of fabric resistivity against the number of titratable acid groups per $10^6$ grams of polyamide. In FIGURE 1, acid modification of the polyamide is accomplished by grafting on maleic acid. In FIGURE 2, acrylic acid is used for the graft modification. In each pair of curves, the upper line represents the relationship between the plotted variables for the calcium salt of the particular acid-modified polyamide. The lower line in each pair of curves represents the relationship between the plotted variables for the sodium salt of the particular acid. The specific data for each curve is presented hereinafter in Examples IV and V.

DEFINITIONS

The term "synthetic linear nitrogenous condensation polymer" is intended to describe a class of substantially linear condensation polymers in which nitrogen atoms occur as part of the polymer molecule "backbone." The best known representatives of this class are the polyamides, which are characterized by recurring

links in the polymer chain, when R may be hydrogen or organic radical. High molecular weight fiber-forming polyamides, now well known as "nylons," are preferred in forming the product of this invention.

Other well-known polymers comprehended in the defined class are the polyurethanes, characterized by recurring

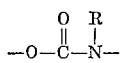

groups, and polyureas, characterized by

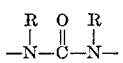

groups. Also included are those polymers with recurring main-chain links such as

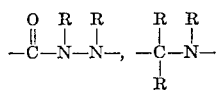

and the like. The R substituents on the nitrogen are preferably hydrogen, but may be a monovalent radical, preferably hydrocarbon radical. In addition to the above, polysulfonamides are useful.

It has been pointed out that the presence of nitrogen as

units in the polymer chain is the feature which characterizes the polymers useful in forming the product of this invention. It is believed that this grouping activates nearby and especially the adjacent carbon-hydrogen groups so that hydrogen is readily abstracted by free-radical initiators, forming a free radical which thus becomes available for attachment of unsaturated acid groups, as explained hereinafter. Thus, copolymers are included among the polymers suitable for forming the product of this invention, provided they contain at least about 1.0% by weight of

atom in the polymer chain.

The term "synthetic, substantially linear condensation polymer" is well understood in the art. The subject is comprehensively treated by Flory in "Principles of Polymer Chemistry," Cornell University Press, Ithaca, N.Y. (1953), pp. 37–50. By "substantially" linear is meant that minor amounts of cross-linking may be present, provided the polymer exhibits the general solubility and melting characteristics of a linear, as distinguished from a highly cross-linked polymer.

By a "high molecular weight . . . polyamide" is intended a polymer, the recurring units of which are connected by linkages predominately of the carbonamide structure, the said polymer having a molecular weight of such magnitude that it is fiber-forming and has a non-tacky surface at room temperature.

By the expression "300 titratable acid groups per $10^6$ grams of polymer" is meant the number of equivalents of —COOH ends per $10^6$ grams of polymer, for example, as determined by the method of G. B. Taylor and J. E. Waltz ("Analytical Chemistry," v. 19, p. 448; 1947).

The above method requires solution of the polymer sample in hot benzyl alcohol; since some of the polymers of this invention are not completely soluble in this solvent, satisfactory results are obtained by gently boiling a 0.3 gm. sample of polymer in 10 ml. aqueous 0.1 N NaOH, followed by back titrating the excess base with 0.1 N HCl using bromocresol green indicator.

By "high energy particle radiation" is meant an emission of high energy electrons or nuclear particles such as protons, neutrons, alpha particles, deuterons, or the like, directed so that the said particle impinges upon the solid polymer bearing the organic acid. The charged particles may be accelerated to high speeds by means of a suitable voltage gradient, using such devices as a resonant cavity accelerator, a Van de Graaff generator, a betatron, a synchrotron, cyclotron, or the like, as is well known to those skilled in the art. Neutron radiation may be produced by bombardment of selected light metal (e.g., beryllium) targets with high energy positive particles. In addition, particle radiation suitable for carrying out the process of the invention may be obtained from an atomic pile or from radioactive isotopes or from other natural or artificial radioactive material.

By "ionizing electromagnetic radiation" is meant radiation produced when a metal target (e.g., tungsten) is bombarded by electrons possessing appropriate energy. Such energy is imparted to electrons by accelerating potentials in excess of 0.1 million electron volts (mev.), with 0.5 mev. and over preferred. Such radiation, conventionally termed X-ray, will have a short wave length limit of about 0.1 angstrom units (in the case of 1 mev.) and a spectral distribution of energy at longer wave lengths determined by the target material and the applied voltage. X-rays of wave lengths longer than 1 or 2 angstrom units are attenuated in air thereby placing a practical long wave length limit on the radiation. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma rays. While gamma radiation is distinguished from X-radiation only with reference to its origin, it may be noted that the spectral distribution of X-rays is different from that of gamma rays, the latter frequently being essentially monochromatic, which is never the case with X-rays produced by electron bombardment of a target.

EXAMPLES

The following examples are cited to illustrate the invention. They are not intended to limit it in any manner. Because of its commercial importance and wide acceptance, the preparation and properties of the product of this invention will be illustrated primarily in terms of polyamide starting materials, which constitute a preferred polymer class for the product of this invention. Unless otherwise noted "66 nylon fabric" employed in the examples is a taffeta fabric, woven from 70 denier polyhexamethylene adipamide continuous filament yarn having a denier per filament of 2.0. The polyamide is produced from hexamethylene diamine and adipic acid (ergo "66"), and has a relative viscosity (as defined in United States Patent 2,385,890) of 37, 39 equivalents of —NH$_2$ ends and 92 equivalents of —COOH ends per $10^6$ grams of polymer (referred to hereinafter as 39 amine ends and 92 carboxyl ends, respectively). The polymer is prepared using 0.34 mol percent acetic acid stabilizer (which ends are, of course, not titratable), which is equivalent to 15 amine ends. From these data, following the method of Taylor and Waltz, the molecular weight (number average) is calculated to be about 13,700.

The "standard" washing to which samples are subjected consists of a 30-minute immersion in 18 liters of 70° C. water contained in a 20 liter agitation washer. The wash solution contains 0.5% of detergent. The detergent employed is that sold under the trademark "Tide." This detergent is known to contain, in addition to the active ingredient, well over 50% (sodium) phosphates (Chemical Industries, 60, 942, July 1947). Analysis shows the composition to be substantially as follows:

16% sodium lauryl sulfate
6% alkyl alcohol sulfate
30% sodium polyphosphate
17% sodium pyrophosphate
31% sodium silicates and sodium sulfate The static propensity of the fabric is indicated in terms of direct current resistance in ohms measured at 78° F. and (except where indicated otherwise) in a 50% relative humidity atmosphere. High values indicate a tendency to acquire and retain a charge and are reported as the logarithm to the base 10, being designated "log R."

The irradiation is carried out using a Van de Graaff electron accelerator with an accelerating potential of 2 million electron volts (mev.) with a tube current of 250 to 290 microamperes. Samples to be irradiated are placed on a conveyor and traversed back and forth under the electron beam at a distance of tube window to sample of 10 cm. The conveyor speed is 40 inches per minute. At the sample location the irradiation intensity is 12.5 watt sec./cm.$^2$ of sample which is approximately equivalent to an available dose per pass of one mrep. Radiation dosages may be given in units of "mrep." (millions of roentgen equivalents physical), a rep. being the amount of high energy particle radiation which results in an energy absorption of 83.8 ergs per gram of water or equivalent absorbing material. Alternatively, dosages may be indicated in terms of exposure in watt-sec./cm.$^2$.

When ionizing electromagnetic radiation is used to induce bonding, the electron beam from the Van de Graaff machine, operated as described above, is directed onto a gold target, and the test samples are irradiated with the X-rays produced. Doses of X-radiation are given in units of "mr." (millions of roentgens), as is conventional. A roentgen is that amount of electromagnetic radiation which when absorbed in 1 cc. of dry air at standard temperature and pressure will produce 1 electrostatic unit of charge of either sign.

Where quantitative values for hole melting are presented, they are measured by dropping heated glass beads of constant weight and diameter from a fixed height from a constant temperature oven onto the fabric. The temperature at which the fabric is stained is called the first damage temperature, and the temperature at which the glass bead melts completely through the fabric is referred to as the hole-melting temperature. Where the hole melting tendency is presented in qualitative terms, the designation "poor" denotes a quantitative rating of about 300° C.; "fair"—a rating of about 400° C. to about 500° C.; "good"—a rating of about 600° C. or slightly better; and "excellent"—a rating well over 600° C.

The fiber melt temperature reported in some examples is determined by placing a thread, unraveled from a fabric if necessary, upon an electrically heated tube and observing the tube temperature at which visible melting, fusing of filaments to the tube, or instantaneous decomposition occurs.

Post-formability is evaluated by contacting a yarn from a sample with a tube heated to about 225° C. A fiber which can be drawn in contact with the tube and without substantially fusing the filaments to two or three times its original length is designated "elastic." When the stretch is retained (without restraint) on cooling, it is designated "post-formable."

Crease recovery is evaluated by crumpling a fabric in the hand, and observing the rate at which it recovers from this treatment. Wet crease recovery indicates the rate and extent of disappearance of creases from the crumpled fabric when it is wetted. Numerical values are obtained using the Monsanto Crease Recovery Method, described as the vertical strip crease recovery test in the American Society for Testing Materials Manual as Test No. D1295–53T. In determining wet crease recovery by this method, the specimens are soaked in distilled water containing 0.5% by weight of "Tween 20," a polyoxyalkylene derivative of sorbitan monolaurate, a wetting agent, for at least 16 hours. Immediately prior to testing, excess water is removed from the test fabrics by blotting between layers of a paper towel. Results are reported as percent recovery from a standard crease in 300 seconds.

*Example I*

A swatch of 66 nylon fabric is padded to saturation with a solution of 25 grams of maleic anhydride dissolved in 75 grams of water, wrapped in aluminum foil and is passed 40 times under an electron beam from a Van de Graaff electron accelerator. The total exposure is 40 mrep. or 500 watt-sec./cm.$^2$. The treated fabric is removed from the aluminum foil and agitated for 2 hours in a 20 liter washing machine containing distilled water at 70° C. to remove unreacted maleic anhydride. The weight gain of the fabric after drying is 8%. When either the padding with maleic anhydride or the irradiation step is omitted, then no weight gain is observed.

The maleic acid-modified nylon is next after-treated, to form the metallic salt of the acid, by agitation for 2 hours in a 20 liter washing machine containing 20 grams of "Tide" detergent (which contains basic metallic salt as shown hereinbefore) dissolved in 18 liters of distilled water at 70° C. It is then thoroughly rinsed in distilled water and dried. An additional weight gain of 7% is noted. When hot ashes from a burning cigarette are flicked onto the fabric, after it has been liquid immersed, irradiated, ion-treated, washed and dried, only a small brown stain results. Holes are immediately melted through a fabric which has not been treated with the unsaturated acid and the metallic ions, whether irradiated or not. The quantitative hole melting tendency determination of the fabric treated according to this example shows a first damage temperature of 300° C. vs. 275° C. for an untreated control and a hole-melting temperature of 600° C. vs. 310° C. for an untreated control. The fabric has elastomer properties such that when heated above 185° C. it can be formed and drawn to as much as 3 times its room temperature length. In addition, it is observed to have been delustered, as is shown by reduction in the percent of incident light transmitted from an original value of 1.5% to 0.5% for the sample treated in accord with this invention. Furthermore, the texture is changed so that it has a much drier handle than the untreated control. The fabric produced by the example is soluble in 90% formic acid, but is insoluble in hot m-cresol. The original nylon is soluble in both solvents.

When the fabric modified in accordance with the example is stirred for one hour at 70° C. in a beaker containing 190 ml. of distilled water and 10 grams glacial acetic acid (to remove metallic ions from the fabric), the fabric loses its high temperature elastomer properties. Furthermore, its hole-melting resistance is reduced to that of an untreated control and it is now soluble in hot m-cresol. Its resistance to hole-melting is restored by a second washing treatment in the "Tide" detergent solution, and the fabric is again insoluble in hot m-cresol. When a 0.1 normal hydrochloric acid aqueous solution is substituted for the aqueous 5% acetic acid solution, to remove metallic ions, similar results are obtained.

*Example II*

A portion of nylon fabric is immersed in a 25% solution of maleic anhydride, the excess liquid squeezed from it, the sample enclosed in aluminum foil and irradiated under the conditions of Example I. The irradiation exposure is 40 passes (40 mrep.) or 500 watt-sec./cm.$^2$. After irradiation, the sample is cut into 6 pieces marked A to F, inclusive. The pieces, except for sample F, are washed in an agitation washer using 70° C. water and the salts as indicated in Table 1. After the washing treatment, the nylon fabric samples are rinsed, dried and tested to determine their resistance to hole-melting, with the results indicated in Table 1. Sample $F_1$ is a control which is subjected to all the treatments outlined above except irradiation.

TABLE 1

| Sample | Wash composition [2] | Number of washings | Resistance to hole-melting |
|---|---|---|---|
| A | 20 grams "Tide," 18 liters of tap water | 2 | Excellent. |
| B [1] | 20 grams "Tide," 18 liters of tap water | 2 | Fair. |
| C | 18 liters of tap water | 1 | Good. |
| D | 18 liters of distilled water | 1 | Poor. |
| E | 13 grams of $Na_3PO_4 \cdot 12H_2O$, 18 liters of tap water | 1 | Excellent. |
| F | (No washing) | None | Poor. |
| $F_1$ | 20 grams "Tide," 18 liters of tap water | 2 | Do. |

[1] No agitation used.
[2] Tap water used contains approximately 11 parts per million of calcium ion.

The results obtained in this example show that substantial resistance to hole-melting is produced when the nylon fabric with the maleic anhydride grafted thereon is exposed to metal ions present in the "Tide" solution, in the hard tap water, or in the solution containing sodium phosphate. It is also apparent that a material improvement in the treatment is obtained when the treatment is carried out under conditions of agitation.

*Example III*

Portions of nylon fabric are immersed in 25% aqueous maleic anhydride, then irradiated using the technique and the conditions of Example I. The irradiated fabric is divided into sections and treated as shown in Table 2. Sample swatches G to L are subjected to 40 passes under the Van de Graaff electron accelerator for a total exposure of 500 watt-sec./cm.$^2$, and samples M to O, inclusive, are given an exposure of 80 passes for a total exposure of 1000 watt-sec./cm.$^2$. Each of the irradiated samples is then agitated for 1 hour at 70° C. in a washing machine containing 18 liters of distilled water and 20 grams of the salt indicated in the table. The samples are then rinsed in hot distilled water, dried and tested for resistance to hole-melting. Sample M (with cupric ion attached) is light green in color and N (with cobaltous ion) is light pink.

TABLE 2

| Sample | Salt in treating solution | Resistance to hole-melting |
|---|---|---|
| G | Sodium carbonate | Excellent. |
| H | Potassium carbonate | Do. |
| I | Potassium acetate | Good. |
| J | Calcium acetate | Excellent. |
| K | Manganous acetate | Do. |
| L | Zinc acetate | Do. |
| M | Cupric acetate | Good. |
| N | Cobaltous acetate | Excellent. |
| O | Chromic acetate | Good. |

From the above results, it is apparent that a substantial improvement in resistance to hole-melting has been attained by treatment of the irradiated, maleic anhydride-grafted nylon fabric with a variety of positively charged metallic ions.

*Example IV*

A series of 9 samples of nylon fabric, coded T to AB, are treated with 25% aqueous maleic acid solution and are then irradiated using the technique of Example I with the radiation doses shown in Table 3 below. After radiation, the samples are rinsed well in distilled water to remove unreacted acid. Analysis of the acid-modified samples so produced shows the presence of a large number of attached carboxyl groups, as well as a weight gain linearly proportional to the irradiation dose.

TABLE 3

| Sample | Dose, mrep. | Weight gain, percent | —COOH equiv./10$^5$ gm. nylon |
|---|---|---|---|
| T (control) | 0 | | 92 |
| U | 2 | 1.4 | 166 |
| V | 5 | 1.9 | 213 |
| W | 10 | 3.0 | 330 |
| X | 15 | 4.0 | 419 |
| Y | 20 | 4.7 | 507 |
| Z | 30 | 8.5 | 771 |
| AA | 40 | 9.6 | 796 |
| AB | 60 | 12.3 | 1,186 |

To prepare the acid salt of the acid-modified polyamide a portion of each of the samples T to AB is agitated for 1 hour at 80° C. in a 1% aqueous (distilled water) solution containing twice the fabric sample weight of $Na_2CO_3$. After reaction with the $Na^+$ ions, the samples are again thoroughly rinsed and dried, and are then given various characterization tests, with the results shown in Table 4.

TABLE 4.—SODIUM SALT OF GRAFTED MALEIC ACID

| Sample | Log R | Fiber melt temp. ° C. | Resistance to hole melting | Post-formable |
|---|---|---|---|---|
| T | 13.3 | 240 | Poor | No. |
| U | 13.3 | 240 | do | No. |
| V | 13.3 | 250 | do | No. |
| W | 12.0 | 255 | Poor to fair | Slightly. |
| X | 11.7 | 255 | Fair | Yes. |
| Y | 11.5 | 275 | do | Yes. |
| Z | 10.1 | 280 | Good | Yes. |
| AA | 9.9 | 305 | do | Yes. |
| AB | 8.0 | 310 | Excellent | Yes. |

A second portion of samples T to AB is agitated for 1 hour in hot (80° C.) tap water containing about twice the fabric sample weight of calcium acetate (as a 1% solution) whereby the calcium salt is formed on and within the fiber. The samples are thoroughly rinsed in hot distilled water, dried and tested as before, with the results shown in Table 5.

A second control of unmodified, irradiated nylon shows the properties of sample T.

TABLE 5.—CALCIUM SALT OF GRAFTED MALEIC ACID

| Sample | Log R | Fiber melt temp., ° C. |
|---|---|---|
| T (control) | 13.3 | 236 |
| U | 13.3 | 236 |
| V | 13.3 | 255 |
| W | 13.3 | 350 |
| X | 13.3 | 350 |
| Y | 13.3 | 374 |
| Z | 13.3 | 374 |
| AA | 13.3 | 390 |
| AB | 13.3 | 405 |

The relation between the number of titratable acid groups on the nylon and the resistivity and fiber melt temperatures of the sodium and calcium salt products are shown graphically in FIGURE 1. The top curve in each pair is the calcium salt, the lower being the sodium salt. It is apparent that appreciable modification of fiber properties is obtained on metal ion treatment when about 300 titratable acid groups are present on the polyamide. Although minor changes may be noted in some cases with 200 acid groups, highly effective changes are produced with 400 or more such groups. Calcium ion is more efficient, on a mole basis, than sodium in improving melt resistance, while sodium ion is preferred when improved antistatic properties are also desired.

*Example V*

Unsaturated monobasic acids are likewise highly effective modifiers. Samples AC to AI of nylon fabric are treated with solutions of commercial acrylic acid in water, at the concentrations shown in Table 6. After soaking for over 30 minutes, the samples are wrung out, wrapped in aluminum foil, and irradiated as in Example I. A dose of only 1 mrep. is employed. The samples are then rinsed in distilled water to remove unreacted acid, dried, and the weight gain and titratable carboxyl groups determined.

TABLE 6

| Sample | Concentration of acrylic acid, weight percent | Weight gain, percent | —COOH equiv./$10^5$ gm. |
|---|---|---|---|
| AC | 0 | 0 | 92 |
| AD | 2 | 3.0 | 439 |
| AE | 5 | 5.8 | 737 |
| AF | 10 | 9.8 | 1,100 |
| AG | 15 | 13.7 | 1,433 |
| AH | 20 | 18.2 | 1,699 |
| AI | 25 | 22.3 | 1,678 |

The samples are divided, treated with sodium and calcium ion solution, and tested, following the same procedure as in Example IV. The properties are as shown in Tables 7 and 8.

Table 7.—SODIUM SALT OF GRAFTED ACRYLIC ACID

| Sample | Log R | Fiber melt temp., °C. | Resistance to hole-melting | Post-formable |
|---|---|---|---|---|
| AC (control) | 13.3 | 240 | Poor | No. |
| AD | 9.8 | 240 | Fair | Yes. |
| AE | 9.5 | 260 | Good | Yes. |
| AF | 8.1 | 352 | Excellent | No. |
| AG | 8.1 | 360 | ...do | No. |
| AH | 8.0 | 380 | ...do | No. |
| AI | 7.7 | 390 | ...do | No. |

When the log R value for sample AI of Table 7 is measured at 5% relative humidity, it rises only to a value of 10.1. Moreover, the moisture regain of this sample is 17.8%, as compared to 4.5% for unmodified nylon. Both measurements of the moisture regain are carried out at 72% RH.

It is surprising to note that whereas polyamide samples modified with either maleic or acrylic acid plus metal ion are post-formable when about 400 or more acid groups are introduced (samples X and AD), when higher concentrations of carboxyl groups derived from acrylic acid (e.g., over 1000 as in sample AF) are introduced, the samples are no longer post-formable. In contrast, the property of post-formability is retained at the high level of carboxyl content when the modification is made by means of maleic acid. This difference is thought to illustrate slightly different reaction mechanisms. For example, acrylic acid, which is readily homopolymerizable, probably forms long chains which are initiated at each reactive site upon the polyamide substrate. Thus, a minimum exposure to irradiation is necessary in order to attain a high degree of modification of fiber properties. On the other hand, with maleic anhydride, which is not capable of undergoing homopolymerization, the predominant reaction is probably that in which one molecule is attached to each free radical site produced by irradiation. Thus, in the latter product, the carboxyl groups are evenly distributed throughout the polymer chains. However, a higher irradiation dose is required to attain an equivalent addition of acid groups. The even distribution of the carboxyl groups is thought to account for the higher degree of heat resistance of the salt of the maleic acid-modified polyamide as well as retention of post-formability even with a concentration level well above 1000 carboxyls per $10^6$ grams of polymer.

TABLE 8.—CALCIUM SALT OF GRAFTED ACRYLIC ACID

| Sample | Log R | Fiber melt temp., °C. |
|---|---|---|
| AC | 13.3 | 236 |
| AD | 13.3 | 250 |
| AE | 13.3 | 284 |
| AF | 13.3 | 396 |
| AG | 13.3 | 414 |
| AH | 13.3 | 417 |
| AI | 13.3 | 420 |

FIGURE 2 plots as abscissa the number of titratable carboxyl groups grafted onto the nylon treated with acrylic acid, in relation to the resistivity and the fiber melt temperature of the sodium and calcium products. Here again the upper curve in each pair represents the calcium salt while the lower curve represents the sodium salt. As in Example IV, it is notable that significant improvement in fiber properties is obtained by metal ion treatment when about 300 titratable acid groups are present on the polyamide. The calcium salt fabrics of Table 8 are noted for improved light durability, in both dyed and undyed condition.

*Example VI*

Samples of nylon fabric marked AJ to AR are immersed in solutions of the acids indicated in Table 9, and are thereafter treated and irradiated in accordance with the procedure of Example I. After irradiation, excess acid is removed by rinsing in hot distilled water. Thereafter the samples are dried and the weight gain and the titratable carboxyl groups determined. The results are shown in Table 9. An irradiated unmodified control (AS) is included for comparative purposes. The blanks in the table represent variables which are not determined.

TABLE 9

| Sample | Agent | Concn., percent | Dose, mrep. | Weight gain, percent | —COOH, equiv. $10^6$ gm. |
|---|---|---|---|---|---|
| AJ | Maleic anhydride | 25 | 20 | 3.5 | 501 |
| AK | Dichloromaleic acid | 25 | 20 | 2.1 | 337 |
| AL | Difluoromaleic acid | (¹) | 20 | 10.3 | 1,321 |
| AM | Fumaric acid | (¹) | 20 | 4.9 | 882 |
| AN | Itaconic acid | (¹) | 20 | 10.3 | 964 |
| AO | Acrylic acid | 25 | 20 | 33.0 | 1,196 |
| AP | Crotonic acid | 25 | 80 | 14.0 | |
| AQ | Furoic acid | (¹) | 80 | 9.0 | |
| AQQ | Propiolic acid | 10 | 40 | 11.7 | |
| AS (control) | None | None | 20 | None | 112 |

¹ Saturated.

TABLE 10.—CALCIUM SALT OF ACIDS OF TABLE 9

| Sample | Calcium ions/ $10^6$ gm. nylon, by analysis | Fiber melt temp., °C. | Resistance to hole-melting |
|---|---|---|---|
| AJ | 262 | 366 | Excellent. |
| AK | 125 | | Do. |
| AL | | 360 | Do. |
| AM | 280 | 290 | Do. |
| AN | 420 | 345 | Do. |
| AO | 1,308 | Over 500 | Do. |
| AP | | | Good. |
| AQ | | | Do. |
| AQQ | | 320 | Excellent. |
| AS (control) | None | 240 | Poor. |

After the acid has been attached by irradiation grafting, the calcium salt is prepared, following the procedure of Example V. The calcium ions attached to the acid-modified nylon are determined by conventional analytical techniques, which values are recorded in Table 10. The blanks in the table indicate properties not quantitatively determined. For comparison, the fiber melt temperature of each sample is also indicated. Although it is apparent that there is not always a close correlation between the calcium ion determined by analysis and the number of titratable groups it is obvious that appreciable amounts of the metal ion have become attached to the fiber through the various acids grafted thereto.

Sample AQQ (modified with propiolic acid) is converted to the sodium salt by washing in sodium hexametaphosphate solution followed by agitation in sodium hydroxide solution. It is found to have a log R value of 10.3 after the standard rinsing procedure, and a melt temperature of 310° C.

*Example VII*

A sample of nylon fabric is soaked in an aqueous solution containing 20% potassium acrylate and methylene blue inhibitor for a period of about 30 minutes. The sample is then irradiated following the technique and under the conditions of Example I to a total dose of 40 mrep. It is thereafter given 15 standard washings, using "Tide" detergent in tap water, followed by a tap water rinse, thus forming the calcium salt. After drying, an 11% weight gain is noted. Log R is high (13.1) as is usual for the calcium salt of an acid-modified polyamide. However, little effect on resistance to hole-melting is observed.

When the calcium salt of the above acid-modified polyamide is transformed into the sodium salt (by washing the sample with an aqueous solution of hexametaphosphate to sequester calcium ions, and sodium hydroxide to supply sodium ions), the log R value after rinsing and drying is 8.9.

While the inventor does not wish to be bound by any particular theory, it is felt that the above results can be explained by the slow penetration characteristics of the potassium acrylate causing a modification mainly at the surface of the shaped structure. Thus, surface effects such as static propensity may be controlled by the technique of the example however, the melting point of the main body of the structure is apparently not affected.

*Example VIII*

Yarn is prepared from polysulfonamide polymer, produced by the condensation of bis(p-aminocyclohexyl)-methane and 4,4'-diphenyldisulfonyl chloride. A small skein of the said yarn weighing 2.3 grams is soaked for 4 hours in 50 ml. of 25% aqueous acrylic acid at room temperature. The excess solution is removed by decantation, and the moist skein is irradiated with electrons to a dose of 2 mrep., using the Van de Graaff accelerator of Example I. The irradiated sample is extracted several times with hot water, to remove ungrafted homopolymer; after drying, the sample shows a weight gain of 15.2%. The polysulfonamide yarn with acid grafted thereto attains a deep shade when dyed with a basic dye, whereas an unmodified control acquires only a very light shade with the same dye.

*Example IX*

The presence of relatively large quantities of other modifiers mixed with the modifying unsaturated organic acid does not appear to unduly interfere with production of the product of the present invention. For example, a sample of nylon fabric is immersed in a mixture of 30 parts maleic anhydride, 70 parts methoxydecaethyleneoxy methacrylate monomer and 100 parts of water. The sample is wrung out, wrapped in aluminum foil and is irradiated to a total dosage of 20 mrep. (125 watt-sec./cm.$^2$) using the equipment and technique of Example I. The fabric is then subjected to 15 standard washings using "Tide" detergent containing sodium ions as disclosed herein above. It is observed to have a much drier hand than an irradiated comparative control which was not immersed in the liquid mixture prior to irradiation. Hot ashes from a burning cigarette are flicked onto the liquid immersed, irradiated, washed fabric to determine its hole-melting tendency. Only a small brown stain results. Holes are immediately melted through the original fabric, whether irradiated or not.

*Example X*

A series of fabric and yarn samples are prepared from the polymers listed in Table 11 and treated as shown in Table 12.

TABLE 11

| Sample | Polymer | Form tested |
|---|---|---|
| CA, CB | Polyamide from metaxylylene diamine and adipic acid. | Fabric. |
| CC, CD | Polyurethane from piperazine and ethylene glycol chloroformate. | Do. |
| CE, CF | Poly(ether-urethane)elastomer | Yarn. |
| CG, CH | Polyamide from 2-methyl hexamethylene diamine and oxalic acid. | Fabric. |
| CI, CJ | Polyamide from m-phenylene diamine and isophthalic acid. | Do. |

The poly(ether-urethane) referred to above is prepared by reacting poly(tetramethylene oxide) glycol (124.5 grams=0.12 mol) having a molecular weight of 1,035 with 10.50 grams (0.06 mol) of 4-methyl-m-phenylene diisocyanate with stirring in an anhydrous atmosphere for 3 hours at steam bath temperatures. To this "dimer" with hydroxyl ends is added without cooling 30.0 grams (0.12 mol) of methylene bis(4-phenylisocyanate) dissolved in dry methylene chloride and the mixture is allowed to react for one hour at steam bath temperatures. The "dimer" with isocyanate ends is allowed to cool and 400 grams of N,N-dimethylformamide is added. To this solution is added 3.0 grams (0.06 mol) of hydrazine hydrate dissolved in 26 grams of N,N-dimethylformamide. The resulting polymer solution, which contained 20% solids, is dry spun in the usual manner to form elastic filaments.

TABLE 12.—TREATMENT CONDITIONS

| Sample | Concn. of aq. acrylic acid, percent | Soaking time, temp. | Irradiation dose, mrep. | Weight gain, percent | Acid group/ $10^5$ gm. |
|---|---|---|---|---|---|
| CA | 20 | 60 min., 25° | 1 | 9.6 | 1,200 |
| CB (control) | 20 | do | None | None | 40 |
| CC | 20 | do | 1 | 30 | 3,200 |
| CD (control) | 20 | do | None | None | None |
| CE | 20 | do | 1 | 12.6 | 1,554 |
| CF (control) | 20 | do | None | None | None |
| CG | 20 | do | 1 | 9.5 | 1,200 |
| CH (control) | 20 | do | None | None | 25 |
| CI | (¹) | 16 hrs., 25° 20 min., 90° | 25 | 3.5 | 440 |
| CJ (control) | | | None | None | (²) |

¹ 50% in dimethyl formamide.
² Not determined.

Following the indicated soaking treatment, the samples are irradiated as in Example V; a dose of 1 mrep. is employed. Suitable controls are similarly treated, but are not exposed to irradiation. Following the irradiation procedure, the samples are washed to remove ungrafted acid, and the weight gain is determined. Portions of each of the modified samples are treated to form the salt. The sodium salt modification is prepared by heating the fabric at 70° C. for ½ hour in a 1% sodium carbonate solution, and the calcium salt modification is prepared from the sodium salt modification by heating in calcium chloride solution. The properties of the two salt-modified samples are indicated in Table 13.

TABLE 13.—MODIFICATIONS PRODUCED

| Sample | Log R at 55% RH | | | Fiber melt temp.,³ C. | | |
|---|---|---|---|---|---|---|
|  | Control | Na | Ca | Control | Na | Ca |
| CA | | 9.6 | | | 364 | |
| CB | >13.3 | | | 216 | | |
| CC | | <7.6 | >13.3 | | 416 | |
| CD | >13.3 | | | 236 | | |
| CE | | | | | | 334 |
| CF | | | | 260 | | |
| CG | | 9.5 | | | 328 | |
| CH | >13.3 | | | 230 | | |
| CI | | 9.1 | | | | |
| CJ | >13.3 | | | | | |

In addition to the properties indicated, samples CA, CG in the acid form showed improved resistance to wrinkling and mussing while wet.

The modified poly(ether-urethane) product of this invention is also useful in preparing the non-woven paper-like material described in U.S. application S.N. 635,731. Examples XI and XII illustrate such preparations. In these examples, strengths of the sheets of paper-like product are determined by depositing the fibers on 100 mesh screen, washing the sheets obtained with approximately 6 liters of water and immediately rolling them off the screen by the couching technique familiar to the paper industry. The sheet is then dried at 120° C. (or, if necessary, at a temperature below the fusion temperature of the polymer) for 2 hours. After cooling, ½ inch strips are cut from the sheet and dry tensile strength is measured on an Instron tester. Tongue tear strength is determined in accordance with ASTM D-39.

Example XI

A poly(ether-urethane) is prepared, following the procedure for the polymer of samples CC, CD of Example X. The polymer solution as prepared in Example X is diluted from 28% to approximately 10% solids content, and 100 grams is placed in a separatory funnel from which it is allowed to trickle slowly into approximately 400 ml. of glycerol in a 1 quart Waring Blendor operating at 14,000 r.p.m.

A mass of fibrous material is produced, as described and claimed in U.S. patent application S.N. 635,731. The components of the mass have been termed fibrids, and will be so referred to hereinafter.

Twenty-three grams of the fibrids so obtained are deposited on a 100 mesh screen to form a control sheet, which is then washed three times with distilled water. Another 23 grams of the fibrids (based on dry weight) are dispersed in 93 grams of water, and this mixture is placed in a 1 gallon polyethylene bag containing 75 ml. of acrylic acid and 180 ml. of water. The mixture is allowed to soak for 2 hours, and is then irradiated (in the bag) for a dose of 1 mrep. After irradiation, the modified fibrids are washed several times with 70° C. distilled water, to remove excess homopolymerized acid. The modified fibrids are then deposited on 100 mesh screen to form a sheet, which is removed and dried. The sheet has good drape and liveliness. The sheet prepared in this manner has a tongue tear strength of 0.122/in./oz./yd.$_2$ as compared with 0.087 for the control.

Example XII

Five grams of the dried unmodified fibrids in sheet form, as prepared in the above example, are soaked for 1 hour in 15 ml. of polymerization-inhibited acrylic acid and 135 ml. of water at room temperature, followed by irradiation in the acrylic acid solution, with a dose of 1 mrep. After the irradiation-grafting step, the resulting modified fibrid is washed four times in hot distilled water at 80° C. The weight gain is 11.9%. A sheet is formed from the fibrid suspension by depositing the fibrids on a 100 mesh screen, followed by washing and drying. The tongue tear strength of the sheet is 0.1/oz./yd.$^2$, as compared to 0.087/oz./yd.$^2$ for the unmodified control; the tensile strength is likewise increased by the acid modification from 1.23 to 1.35 lbs./in./oz./yd.$^2$. When the modified dried fibrid sheet is treated in sodium carbonate solution to form the sodium salt, the tongue tear strength is increased to 0.116. The divalent ion modification (such as calcium) increases the tear strength to an even greater degree than the sodium form.

In Examples XIII and XIV below the product of the present invention is made from a polyurethane foam. The preparation of polyurethane foam from a liquid foam-forming mixture of water and free isocyanate radical-containing polyurethane products resulting from the reaction (1) an alkyd or other active hydrogen-containing organic polymeric material and (2) organic compounds containing, as the sole reacting groups, a plurality of isocyanate groups is described in "German Plastics Practice" by De Bell et al., 1946, pp. 316 and 463–465.

Example XIII

A fine-pore, ester-type polyurethane foam is produced by mixing 23.3 grams of toluene diisocyanate containing 80% toluene-2,4-diisocyanate and 20% toluene-2,6-diisocyanate into a composition of the following:

| | Grams |
|---|---|
| Polyester resin | 70.0 |
| Polyoxyethylated vegetable oil | 0.7 |
| N-coco-morpholine | 0.79 |
| Water | 1.7 |
| Diatomaceous silica, average particle size 7–9 microns | 2.0 |
| Benzidine yellow pigment | 0.1 |

The "polyester resin" is the reaction product of diethylene glycol, adipic acid, and trimethylolpropane in a 13/13/1 molar ratio. Its physical properties are:

| | |
|---|---|
| Viscosity cps | 16,000 |
| Acid No | 2.02 |
| Specific gravity | 1.194 |
| Percent water | 0.17 |
| Hydroxyl No | 66.8 |

After a holdup time of approximately 10 seconds, the mixture is placed in a mold where foaming occurred in about 30 seconds, being complete in about 3 to 4 minutes. The product is cured for about 8 hours at room temperature.

Samples of the foam prepared as described above are weighed, and then subjected to mechanical working to improve porosity (by pounding under water). These are then soaked in an aqueous 25% by volume acrylic acid solution, and placed in small glass bulbs in an atmosphere of nitrogen. The first sample CL is given an exposure of 2 mrep., using the 2 mev. Van de Graaff accelerator as in Example I. A control sample CM is treated identically except that it is not irradiated. After constant washing for several hours, the foams are dried to constant weight. Sample CL has gained 14.0% over its initial weight, while sample CM has lost 0.9%. In order to convert the polyacrylic acid component to the more hydrophilic sodium salt, the foams are next soaked 30 minutes in a 2% aqueous $Na_2CO_3$ at 90° C. Upon redrying, it was found that the sample CL now shows a net weight gain of 10.7% over its initial weight, while sample CM has lost a net 1.9%. The foams are then tested for wickability by immersing their dampened edges in water, and noting the rate at which water enters, as well as the equilibrium distance it rises. With sample CL, portions of the foam wet very readily to a height of about one inch. Also, the foam takes up enough water to submerge itself when squeezed dry and placed on the surface of the water. The control sample CM shows no wickability by the first test, and continues to float on the surface of the water for several hours in the second test.

Example XIV

A coarse-pore, ether-type polyurethane is produced by rapidly mixing together 50 grams of a prepolymer, described hereinafter, with 0.5 gram of polyoxyethylated vegetable oil, 0.5 gram of N-methyl morpholine and 0.5 gram of water, the mixture then being poured into a mold to foam. After the foam has raised to its maximum height, it is cured for 4 hours in an oven at 75° C.

The prepolymer referred to above is prepared by heating together at 120° C., with stirring and under nitrogen for 2 hours, 300 grams of a polyether block copolymer containing 90% polypropylene oxide with 10% polyethylene oxide (molecular weight, about 2000) and 27.3 grams of toluene diisocyanate. An additional 64.2 grams of toluene diisocyanate is then added at 120° C. over a 30-minute period, following which the mixture is rapidly cooled to 30° C.

Samples of the large-pore foam, prepared as described above, are weighed and mechanically worked to improve porosity as in Example XIII. These are then soaked similarly in an aqueous 25% (by volume) acrylic acid solution, and placed in small glass bulbs in an atmosphere of nitrogen. One sample CN is irradiated in a manner identical to Example XIII. A control sample CO is treated identically except that it is not irradiated. After water washing for several hours, the foams are dried to constant weight. Sample CN has gained 12.5% over its initial weight, while sample CO has gained 0.4%. In order to convert the polyacrylic acid component to the more hydrophilic sodium salt, the foams are next soaked 30 minutes in 2% aqueous $Na_2CO_3$ at 90° C. Upon redrying, it is found that the sample CN now shows a net weight gain of 18.4% over its initial weight while sample CO has lost a net 0.1%. The foams are then tested for wickability by immersing their dampened edges in water, noting the rate at which the water enters, as well as the equilibrium distance it rises. With sample CN, portions of the foam wet very readily to a height of about three-quarters of an inch. Also, this foam takes up enough water to submerge itself when squeezed dry and placed on the surface of the water. The control sample CO shows no wickability by the first test, and continues to float on the surface of the water for several hours in the second test.

Although the process of this invention has been described in terms of grafting an unsaturated carboxylic acid to the shaped polymeric structure, followed by reaction to form the metal salt of said acid, or even as a one-step process in which the organic salt (e.g., potassium acrylate) is grafted in a single operation, acids other than carboxylic are also effective, as shown by Examples XV and XVI.

*Example XV*

A portion of nylon fabric is soaked in an aqueous solution of potassium styrene sulfonate and is then irradiated with a dose of 20 mrep., following the procedure described hereinabove. The sample is rinsed in methanol to remove excess monomer, followed by a 30-minute washing in acetone to remove surface polymer. It is then given 10 standard washings in "Tide" detergent, and its antistatic properties are tested. The log R value is 11.6, compared to 13.2 for untreated nylon.

When the test is repeated using a highly purified potassium styrene sulfonate (96.5% pure monomer), in which the nylon sample is soaked (as a 25% aqueous solution), and is then irradiated to a dose of 15 mrep., the sample after washing shows a weight gain of 18.9%. When it is tested for antistatic properties, it has a log R value, after 25 "Tide" washes, of 9.6. The sample is also resistant to hole-melting, is more resilient than an untreated 66 nylon control, and is more resistant to soiling by oily soils.

Similar results are obtained when the fabric is first irradiated (at Dry Ice temperature) and then contacted with the potassium styrene sulfonate solution.

A lower radiation dose may be employed to produce equivalent modification when higher soaking and irradiation temperature are used. A nylon sample is soaked 15 minutes in a 30% aqueous solution of purified sodium styrene sulfonate held at 80° C., followed by irradiation to a dose of 1 mrep. After washing to remove homopolymer, a 23% weight gain is observed. When converted to the sodium salt, given 5 standard washings, the log R is 7.5, and the sample has a high degree of wet crease recovery. When the test is repeated, with 0.1% hydroquinone polymerization inhibitor added to the sodium styrene sulfonate treating solution, much less ungrafted homopolymer is obtained, representing a decreased loss for reagent; in addition, more uniform grafting is obtained.

*Example XVI*

Samples of 66 nylon fabric are soaked in solutions of acids under the conditions specified in Table 14, following which they are irradiated under the conditions of Example I, to the doses indicated. The weight of acid grafted, following the standard washing procedure, is shown in the table, as well as the number of titrated grafted acid groups.

TABLE 14.—USE OF NON-CARBOXYLIC ACIDS

| Sample | Treating solution | Soak time, temp. | Irradiation dose, mrep. | Weight incr., percent | Acid groups/ $10^6$ g. |
|---|---|---|---|---|---|
| DA | 5% ethylenesulfonic acid. | 24 hr., 25° C | 2 | 5.8 | 508 |
| DB | 2% allylsulfonic acid. | 24 hr., 25° C | 20 | 4.2 | 364 |
| DC | 11% vinylphosphonic acid. | 24 hr., 25° C | 40 | 7.3 | 640 |

Following the irradiation step, the sodium salt modifications are formed. The sodium salt is formed by a 30-minute boil in 5% aqueous sodium acetate. The resulting properties are indicated in Table 15.

TABLE 15.—PROPERTIES OF MODIFIED POLYAMIDE

Sample: Log R Na Form
DA _____ 9.1
DB _____ <10.7
DC _____ 8.3
Unmodified control_____ 13.3

*Example XVII*

A series of nylon samples are prepared following the procedure of sample AF in Example V. Each sample contains about 10% by weight of grafted acrylic acid chains. The samples are treated with the metal salt solutions indicated in Table 16, by boiling for one hour in ten times the fabric (sample) weight of distilled water containing two times the fabric weight of the specified salt. The copper salt (EF) is prepared by soaking for about 16 hours at 25° C., rather than at the boil.

TABLE 16.—TREATMENT OF ACRYLIC-MODIFIED NYLON WITH METAL IONS

Sample: Salt treatment
EA (control)_____ Water (no salt).
EB_____ Aluminum acetate.
EC_____ Chromic acetate.
ED_____ Cobaltous acetate.
EE_____ Nickel nitrate.
EF_____ Cupric acetate.
EG_____ Stannic chloride.
EH_____ Cerous nitrate.
EI [1]_____ Alumina sol.[1]

[1] Sample EI is soaked for 30 minutes in a 3% (w./w.) alumina sol prepared by dispersing water-dried Boehmite in distilled water with a Waring Blendor followed by filtration of any large solid particles.

The properties of the modified samples are listed in Table 17. Sample AI (22.3% graft, from Example V) in the sodium form, is included for comparison.

TABLE 17.—PROPERTIES OF SALT-MODIFIED NYLON-ACRYLIC ACID GRAFT SAMPLES

| Sample | Color | Resistance to hole-melting | Log R 50% RH, 78° F. | Wickability,[1] seconds | Wet crease recovery | Percent area increase on wetting |
|---|---|---|---|---|---|---|
| EA | White | Poor | 13.3 | 496 | Fair | 3.5 |
| EB | do | Good | 11.5 | 164 | Fair to good | 7.1 |
| EC | Lt. green | Excellent | 11.5 | 3,600 | Fair | 9.6 |
| ED | Purple | Good | 13.3 | 1,800 | do | 12.8 |
| EE | Pale green | do | 13.3 | 3,600 | do | 10.0 |
| EF | Turquoise | Excellent | 13.3 | 116 | Poor | 11.8 |
| EG | White | Poor | 10.6 | 154 | Good | 7.1 |
| EH | do | Good | 13.3 | 1,500 | Fair | 10.0 |
| EI | do | Poor | 9.5 | | | |
| AI (Ex. V) | do | Excellent | 8.5 | 13 | Excellent | [2] −3.5 |

[1] Wickability is measured by the time (sec.) required for a drop of water to soak into the sample.
[2] Decreased.

The alumina-treated sample (EI) retains its antistatic properties on repeated standard washings in "Tide"; it is also resistant to exchange by $Ca^{++}$ ion.

From the foregoing table, it is apparent that a wide range of fabric properties may be modified by selection of the indicated cation, or even by use of a colloidal sol.

When samples EC, ED, EE, and EF, bearing Cr, Co, Ni, and Cu ions, respectively, are heated in evacuated tubes at 200° C. for 30 minutes, they become stable to ion exchange (i.e., they are not replaced by Na on exposure to $Na_2CO_3$ solution) unlike the unheated samples. There is a loss in antistatic properties and a decrease in wickability, and in some cases a decrease in resistance to hole-melting. It is thought that these changes are produced by conversion of the ionic salt to a less ionic or coordination complex as a result of the heat treatment.

The acid-grafted product of this invention may be treated with complex ions to form a coordination compound, without necessity for high temperature treatment, which is relatively stable to exchange by calcium, sodium and hydrogen ions, as shown in Example XVIII below.

*Example XVIII*

Nylon-acrylic acid-graft fabrics corresponding to AF of Example V are treated by boiling in solutions of complex ions prepared as indicated below.

(1) Sample EJ boiled in an 8.09% (composition based on chromium content) solution of $Cr(OH)Cl_2$ for 30 minutes. It is thought that the complex:

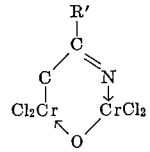

is formed, where

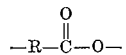

represents the acrylic acid groups grafted onto the nylon, the remainder of the molecule being represented by —R—.

(2) Sample EK, boiled in a 0.022 molar solution of
$$[Co(en)_2CO_3]Cl$$
where (en) is ethylenediamine. The preparation of this complex is described by J. C. Bailar, Jr., Inorg. Syn., 2, 223 (1951). The complex formed is thought to be:
$$[Co(en)_2(RCOO_2]X$$
where RCOO represents the acrylic acid grafted to the nylon and X is Cl or RCOO.

The properties obtained are indicated in Table 18 below.

TABLE 18

Nylon-Acrylic Acid Graft Fabrics Modified by Complex Ions

| Sample | Color | Resistance to hole-melting | Log R initial |
|---|---|---|---|
| EJ | Pale green | Fair | 10.5 |
| EK | Wine | Fair-good | 11.5 |
| AI (control) | White | Excellent | 8.5 |

Stability to Ion Exchange

| Sample | Log R 2 washes | Log R[1] after Ca treat | Log R[2] after acid treat |
|---|---|---|---|
| EJ | 9.1 | 11.1 | 11.6 |
| EK | 11.7 | 11.7 | 11.5 |
| AI (control) | 9.0 | 13.3 | 13.3 |

[1] Log R after boiling in 5% calcium acetate for 10 minutes.
[2] Log R after boiling in 5% acetic acid for 30 minutes.

Retention of low log R values by samples EJ and EK after $Ca^{++}$ and $H^+$ treatment shows that the ion complexes are resistant to ion exchange; compare sample AI, which readily exchanges $Na^+$ for $Ca^{++}$ or $H^+$, with loss of antistatic properties.

*Example XIX*

This example illustrates another method of obtaining the novel product of this invention.

A portion of 66 nylon fabric is soaked for 24 hours in freshly distilled vinyl acetate. The sample is then exposed to the electron beam as in Example I, for a total exposure of 3 mrep. The excess polyvinyl acetate is removed by extraction with methylethylketone, after which the weight gain is found to be 34.7%. The acetate groups are then hydrolyzed by boiling the sample in 0.2 N sodium hydroxide. The hydrolysis is found to be complete after a 1 hour boil. Minor amounts of polyamide and/or polyvinyl acetate are removed by hydrolysis, but the weight gain attributed to the grafted polyvinyl alcohol is 13.1%. Analysis shows 2990 titratable hydroxyl groups grafted to the nylon. The hydroxyl groups derived from polyvinyl acetate are then esterified by boiling the sample for 3 hours in a 10% solution of succinic anhydride dissolved in tertiary amyl alcohol. Pyridine (0.1%) is added to the solution as a catalyst. After the boil, the sample is thoroughly extracted with hot acetone. The sample is divided into two portions, and corresponding sodium and calcium salts are prepared by boiling the fabrics for 30 minutes in 5% sodium and calcium acetate solutions, respectively. The sodium salt is hydrophilic, has excellent wickability, good wet crease recovery, and a log R of 7.5. The calcium form is stiffened, is not wickable, and is highly resistant to hole-melting.

*Example XX*

It is often advantageous to graft two or more modifiers to the nitrogenous polymer substrate, as is shown in this example. Three nylon fabrics are soaked for 1 hour in the solutions indicated in Table 19 at room temperature.

TABLE 19.—SIMULTANEOUS GRAFTING OF TWO MODIFIERS

| Sample | Solution composition, percent by weight in water |
|---|---|
| GA | 10% ethylene sulfonic acid plus 15% inhibited acrylic acid. |
| GB | 15% acrylic acid. |
| GC | 5.3% sodium styrene sulfonate plus 11% acrylic acid. |

The fabric samples are then irradiated with a dose of 2 mrep., washed in distilled water and dried. The percent weight gain due to grafted acid is indicated in Table 20. Sulfur analysis showed that sample GA contained 6.2% of ethylene sulfonic acid, while sample GC contained 4.9% of sodium styrene sulfonate, the balance, of course, being acrylic acid. It is noteworthy that particularly efficient grafting is obtained with a combination of sodium styrene sulfonate and acrylic acid (sample GC). The acid groups introduced by the grafting process are listed in Table 20. The sodium salt is formed by boiling the samples in sodium carbonate solution; the sodium salt form is converted to calcium by calcium acetate treatment. The log R and resistance to hole-melting of each are listed in the table.

TABLE 20.—RESULTS OF TEST

| Sample | Weight grafted, percent | Acid ends introduced equiv./$10^6$ gm. | Log R, Na form | Resist hole melting, Ca form |
|---|---|---|---|---|
| GA | 14.6 | 1,460 | 8.5 | Good. |
| GB | 10.1 | 1,280 | 8.5 | Do. |
| GC | 24.6 | 2,350 | <7.5 | Do. |

*Example XXI*

This example illustrates the use of basic organic ions in forming the salt of acid modified polyamide. A sample of 66 nylon fabric (labeled HA) is prepared by soaking in 10% acrylic acid solution and then irradiating, so that it is similar to sample AF of Example V (Table 6). The other 66 nylon samples, identified as HB, HC, HD, are likewise prepared by soaking in 25% acrylic acid solution followed by irradiating, so that they are substantially similar to sample AI in Example V. These samples, after irradiating and washing, are soaked overnight at room temperature in the aqueous solutions indicated in Table 21. After overnight soaking, sample HD is agitated in the polymeric quaternary amine solution for an hour at about 40–50° C. The samples are then rinsed in distilled water and the weght gain induced by the formation of the amine salt is determined. In addition, the log R value and the resistance to hole-melting are measured with the results listed in Table 21. In addition to the listed property changes, it is noted that all the samples are highly wickable (rapidly absorb water). In addition, these samples show a high receptivity to acid dyes.

TABLE 21

| Sample | Treating agent | Weight gain after treating, percent | Log R | Resistance to hole-melting |
|---|---|---|---|---|
| HA | 82% hexamethylene diamine | 4.7 | 10.1 | Fair. |
| HF | 82% hexamethylene diamine | 10.9 | 8.7 | Good. |
| HB | 30% aqueous $NH^4OH$ | (1) | 10.7 | Do. |
| HC | 15% aqueous solution of a poly-methylpryidinium sulfate of the formula $(-CH_2-CH-)_n$ with $CH_2$ attached to phenyl ring bearing $N^+ CH_3SO_4^-$ and $CH_3$ | 1/2 | 11.0 | Poor. |

[1] Not determined.
NOTE.—"$n$" indicates the degree of polymerization.

In this example the polyamide is rendered melt resistant by the formation of salts which are not distinguished by having a high degree of heat resistance in themselves. It is believed, therefore, that this melt resistance is produced by the formation of ionic bonds throughout the polymer network, rather than by any heat resistance property of the amines themselves. The poor resistance to hole-melting imparted by treatment with the polymeric quaternary amine (sample HC) is believed to be due to salt formation only on the surface, due to low penetration of the large ion.

A nylon sample HD, bearing a total of 2227 equivalents of —COOH groups/$10^6$ gm., prepared by acid treatment of the sodium salt form, is converted to a quaternary ammonium salt by soaking in a 1.0% solution of a quaternary ammonium hydroxide. The said quaternary base is prepared by reacting Arquad 18, a compound of the formula: $R(CH_3)_3NCl$ where R=6% hexadecyl, 93% octadecyl, 1% octadecenyl, with freshly prepared silver oxide. A sodium-modified control, sample HE, is prepared by agitation of the acid-modified nylon in sodium carbonate solution. Both test and control samples are rinsed 100 times in distilled water and 10 times in cold tap water (containing $Ca^{++}$) without change in log R, from its initial value of 8.9. After two more rinses in hot (80° C.) tap water, the log R of the test sample, HD, remains unchanged, whereas the control, HE, increases to 11.1, due to partial exchange of $Na^+$ for $Ca^{++}$. The quaternary ammonium base is thus more resistant to ion exchange than the sodium salt.

When a third sample, HF, is converted to the sodium salt, like HE, followed by treatment with the quaternary ammonium chloride, it behaves like sample HD.

*Example XXII*

Samples of 66 nylon fabric and 6 (polyamide from caprolactam) nylon fabric, prepared from 70 denier, 34 filament yarn, are cut into 8" x 1" strips and soaked in various unsaturated acids as shown in Table 22. Each sample is then folded into 1" x 1" squares, individually wrapped in aluminum foil, and is exposed to X-radiation produced from a 2-million electron volt (2 mev.) Van de Graaff electron accelerator. The accelerator is operated so that the electrons impinge on a gold target, generating X-rays which are directed onto the pile of samples. The distance of the sample to the tube window is 2 centimeters. A tube voltage of 2 mev. and a current of 250 microamperes is used, resulting in a radiation dosage of about 2-millions of roentgen (mr.) per hour.

After radiation for a period of 8 hours, giving an exposure of about 15 mr., the fabric samples are removed and washed in distilled water at about 70° C., with vigorous agitation, for several half-hour periods. They are then dried and weighed. The weight gain each is shown in Table 22. The fabrics of acid-modified polyamide so produced are then treated with various metallic salts dissolved in water at 70° C., with rapid agitation, covering several one-hour periods to form the metallic salt derivatives. The samples are thereafter rinsed thoroughly in distilled water, dried, weighed, and tested for heat resistance.

Maleic anhydride and maleic acid are applied to the polymer substrate as a 25% solution in water. The itaconic and fumaric acids are applied as saturated aqueous solutions. The calcium acetate soltuion used in forming the metallic salt derivative consists of 50 grams of calcium acetate dissolved in 5 liters of distilled water. The trisodium phosphate (10 g.) is dissolved in 5 liters of distilled water. The results of these tests are indicated in Table 22.

TABLE 22

| Sample | Fiber | Unsaturated acid | Weight gain, percent | Metallic salt | Additional weight gain, percent | Resistance to hole melting |
|---|---|---|---|---|---|---|
| AT | Nylon 66 | Maleic | 9.2 | $Ca(CH_3COO)_2$ | 3.5 | Excellent. |
| AU | do | Maleic anhydride | 9.2 | $Na_3PO_4$ | 0.5 | Do. |
| AV | do | Itaconic acid | 9.2 | $Ca(CH_3COO)_2$ | 2.4 | Do. |
| AW | do | do | 9.2 | $Na_3PO_4$ | 0.5 | Do. |
| AX | do | Fumaric acid | 8.0 | $Ca(CH_3COO)_2$ | 2.6 | Do. |
| AY | do | do | 8.0 | $Na_3PO_4$ | (¹) | Do. |
| AZ | Nylon 6 | Maleic acid | 6.8 | $Ca(CH_3COO)_2$ | 2.9 | Do. |
| BA | do | do | 6.8 | $Na_3PO_4$ | 0.8 | Good. |

¹ Not measurable.

The irradiation dose to which the polymer substrate is exposed while in contact with the unsaturated acid must be sufficient so that bonding is induced between the said acid and the substrate. In general, a dose of about 0.01 mrep. (equivalent to an exposure of about 0.1 watt-sec./cm.²) is adequate to initiate the bonding between the unsaturated acid and the polymer substrate. It is preferred to use a dosage of at least about 0.1 mrep. (equivalent to an exposure of about 6 watt-sec./cm.²). Higher dosages may be used and are frequently highly beneficial. Dosages so high that substantial degradation of the shaped substrate occurs must obviously be avoided. It is usually satisfactory to irradiate polyamide substrates with doses of 80 mrep. (1000 watt-sec./cm.²) but doses substantially in excess of 160 mrep. (2000 watt-sec./cm.²) are usually undesirable and unnecessary. Doses of the same numerical magnitude, but expressed in mr. units, are satisfactory when using electromagnetic radiation.

The radiation dose sufficient to graft enough organic acid so as to provide at least 200 titratable acid groups/10⁶ grams of polymer will vary with the unsaturated acid used. For example, to obtain the same level of titratable acid groups, acrylic acid (since it is a homopolymerizable vinyl monomer, and is thus capable of undergoing a chain reaction) requires a smaller dose than maleic acid, which is not homopolymerizable. This effect is shown in Examples IV and V. Higher concentrations of acid assist in producing more pronounced modifications and hence lower radiation doses may be used with more concentrated acid solutions, as shown in Example V. However, high concentrations of acids are sometimes harmful to fiber properties, the effect increasing with treatment temperature. As a guide, it is preferred to restrict acrylic acid concentration to 30 to 40% at 25° C., and not over about 25% for temperatures above 50° C.

The irradiation step of this invention has been described in terms of irradiating the polymer substrate while in contact with the unsaturated acid. However, in some cases it is possible to carry out the irradiation step on the polymer substrate alone and subsequently contact it with the unsaturated acid. This two-step process is effective when the substrate is held at low temperatures during the irradiation and until contacted with the unsaturated acid or when the irradiation is carried out in a vacuum or in an inert gas atmosphere which must be maintained until the polymer is contacted with the unsaturated acid. This two-step treatment is particularly effective in those cases in which the unsaturated acid is capable of undergoing additional homopolymerization.

Although the preferred method of grafting the unsaturated acid to the polymer is by means of ionizing radiation, due to the effectiveness, versatility, and high rate of throughput of the technique, unsaturated acids capable of conventional vinyl polymerization may be employed in producing the acid-modified high molecular weight nitrogenous condensation polymer of the present invention by means of conventional initiators for vinyl polymerization. This latter technique avoids cross-linking of the substrate which may accompany the irradiation procedure. Such a process is illustrated in Examples XXIII to XXVII using a polyamide as substrate.

Example XXIII

Swatches of 66 nylon fabric woven from 40 denier 34 filament yarn are placed in a polyethylene bag which is charged with 30 cc. of an aqueous solution containing 25% acrylic acid and 0.2% ammonium persulfate (parts by weight). The bag is sealed and the acrylic acid solution is allowed to penetrate the fabrics at room temperature for 30 minutes. The bag is then heated at 90° C. for 1 hour to induce polymerization. The fabrics have a visible coating of polyacrylic acid which is removed by 6 rinse cycles, comprising agitation in distilled water at 60° C. for 1 hour each. The samples are then subjected to individual tests.

Sample BB is Soxhlet extracted with water for 12 hours prior to the above-mentioned 6 rinse cycles. It shows a 7.9% weight increase after the complete treatment.

Sample BC is titrated for carboxyl groups and is found to contain 937 equivalents/10⁶ grams of polymer. The original nylon fabric has 92 carboxyl ends.

Sample BD is treated with a 1.0% solution of sodium hydroxide in distilled water. After thorough rinsing, it has a log R value of 8.0, and shows substantial resistance to hole melting.

Sample BE is agitated in a solution containing 0.3% calcium acetate in water at 60° C. for 3 consecutive cycles of 30 minutes each. The final product is highly resistant to hole melting. It is thereafter given 20 standard wash cycles using "Tide" detergent in tap water. Its resistance to hole melting remains unchanged.

Since polyacrylic acid is soluble in water, it is possible to show that the carboxyl groups are attached chemically to the polyamide structure by the grafting process. This is done by dissolving the acid-grafted polyamide in a solvent and thereafter adding water to reprecipitate the polyamide (and dissolve whatever polyacrylic acid may be in the solution). To illustrate this, a portion of nylon fabric with acrylic acid grafted thereto is dissolved in 90% formic acid, the solution is filtered, then the modified polyamide is reprecipitated by the addition of water. The precipitated polymer is filtered off, and the precipitate washed eight times with distilled water, followed by drying in a vacuum oven at 70° C. for 20 minutes. Analysis of the precipitate, following the technique described above, shows the presence of 2158 carboxyl ends. The original sample is found by analysis to have 2130 carboxyl ends. These results show that the acrylic acid is chemically grafted to the polyamide, since polyacrylic acid is water soluble and would not have been precipitated with the polyamide unless chemically grafted thereto.

Example XXIV

Two pieces of nylon film (4½ inches by 3 inches by 0.002 inch) are treated with acrylic acid-ammonium persulfate solution following the technique described in Example XXIII. After the treatment, piece No. 1 is Soxhlet extracted with water for 42 hours, whereas piece No. 2 is rinsed in distilled water at 60° C. and post-treated with calcium acetate as described for sample BE. Both pieces of film are placed upon a heated metal block and covered with a glass plate. When the temperature is increased to 300° C., the film treated with the calcium acetate (No. 2) retains the same flexibility as the initial untreated material, whereas the control (No. 1) not treated with metal ion is brittle and degraded, and falls into pieces when flexed.

*Example XXV*

The use of relatively high temperature for the polymerization step is advantageous in reducing the polymerization period, in permitting polymerization in the presence of inhibitors and in improving the wet crease resistance of fabrics.

A swatch of nylon fabric, coded RA, is soaked in a 25% solution of freshly distilled methacrylic acid and 0.2% ammonium persulfate for 30 minutes. The swatch, while soaking wet, is wrapped in aluminum foil and then ironed with a tailor's iron heated to 125° C. for a period of 2 minutes. After rinsing and drying, sample RA shows a weight gain of 40.5%. When the above test is repeated, except that 0.025% hydroquinone (a standard polymerization inhibitor) is present in the persulfate-containing polymerizable composition, the observed weight gain of sample RB is 10.8%, in spite of the presence of the inhibitor.

Sample RB is boiled in 1% NaOH solution, forming the sodium salt of the grafted polyacrylic acid. In this form, the fabric is antistatic, resistant to hole melting, and shows a high degree of wet crease recovery.

*Example XXVI*

A degassed nylon fabric is exposed in an opaque tube to degassed 25% aqueous acrylic acid (free from inhibitor) under vacuum at room temperature for 15 hours. The sample is then thoroughly washed with water at 60–80° C., thus removing unattached acrylic acid homopolymer. The nylon fabric is found to have gained 18% in dry weight. When the sodium salt of the grafted acrylic acid is formed by boiling in dilute sodium hydroxide solution, as described hereinabove, improved antistatic effect, resistance to hole melting, and wickability are noted, as described hereinabove.

To establish that the acrylic acid is grafted to the nylon, a portion of the treated fabric is dissolved in 90% formic acid, followed by recovery of the dissolved polymer by pouring the solution into water contained in a Waring Blendor, filtering, and washing the precipitate thoroughly with water. Titration of the precipitated polymer shows 1626 equivalents of carboxyl per $10^6$ grams of polymer as compared to 1656 ends before precipitation and washing.

*Example XXVII*

A 7" x 9" nylon taffeta swatch of 2.5 g. weight is shaken for one hour at room temperature in an aqueous solution containing 22% sodium styrene sulfonate and .05% ammonium persulfate. It is wrapped in aluminum foil and placed under a hot plate (kept at 135–150° C.) for three minutes. After vigorous agitation in 4 gal. of 50° C. distilled water for 30 minutes, the desiccated sample shows 4.8% weight gain. Its log R at 55% R.H. is 8.9 (vs. 13.3 for unmodified control).

A drop of water placed on the treated fabric disappears in 0.4 minute, as compared to about 20 minutes for an untreated control.

Conventionally drawn polyamide yarn when treated as described herein becomes highly drawable at elevated temperatures (e.g., above 185° C.), as compared to the untreated yarn, as shown in Example XXVIII below.

*Example XXVIII*

66 nylon yarn of 34 filaments is drawn to 5.17 times its as-spun length as taught by Babcock in Unted States Patent No. 2,289,232. The yarn has a denier of about 220. To prevent entanglement during washing, it is woven into a fabric having a polyethylene terephthalate warp. Samples of the fabric are soaked in a 25% aqueous solution of maleic acid. Three of these, BF, BG, and BH are irradiated using the technique and under the conditions of Example I. Sample BH is a control. A dose of 20 mrep. is used. Sample fabrics BF, BG, and BH are then thoroughly rinsed in distilled water to remove excess ungrafted acid. Thereafter BF and BG are agitated for several 30-minute periods in a 20-liter washing machine containing 18 liters of 70° C. distilled water and 20 grams of calcium acetate. The fabrics are again rinsed in distilled water to remove unreacted ions, dried, and the nylon yarn unraveled and then backwound onto cones. The treated irradiated yarn is then post drawn at a feed rate of 7 feet per minute over a hot pin at 160° C. and a hot surface of 250° C., using the apparatus of Hume (United States Patent No. 2,533,013). Yarn of fabric BF is drawn 2.1 times and BG is drawn 2.6 times its original length. Control BH fuses and breaks immediately, when attempts are made to draw it. Two other controls, neither of which is soaked in maleic anhydride, but each of which is washed (BI being irradiated and BJ being not irradiated) also break and fuse when attempts are made to draw them.

*Example XXIX*

The utility of unsaturated acids other than carboxylic, in forming the product of this invention, has been illustrated in Example XVI. An especially useful species of such acids is styrene sulfonic acid.

The grafting of preformed salts of this acid, potassium and sodium styrene sulfonate, is shown in Example XV. The use of the acid results in rapid penetration of the fiber at room temperature, so that higher degrees of modification are obtained at constant irradiation dose. This avoids the higher soaking temperatures, useful when sodium styrene sulfonate is employed.

The styrene sulfonic acid used to react with the modified polyamide of this example is prepared (by ion exchange) from a commercial sodium styrene sulfonate product. The product is found by analysis to consist of 76 parts styrene sulfonic acid (SSA) and 24 parts sodium styrene sulfonate (SSS), making 100 parts of monomer.

A nylon fabric sample is soaked in an aqueous solution of SSA–SSS of 35% monomer content for about 16 hours at room temperature, followed by irradiation with 2 mev. electrons to a total dose of 1 mrep. After removing homopolymer and washing, a weight gain of 25% is observed, and analysis shows 882 acid groups/$10^6$ gm. fabric.

The acid modification is converted to the sodium salt by agitating in 0.5% sodium carbonate solution for 15 minutes at 25° C., followed by 15 minutes' boiloff. After thoroughly rinsing, the sample has a log R (55% RH) of 7.5, very high wickability, a moisture regain of 9.09% at 72% RH (vs. 4.37 for unmodified nylon), high wet crease recovery, and excellent resistance to hole melting.

The sample is then converted to the calcium salt by boiling for 30 minutes in a 1% calcium acetate solution (100 ml./gm. fabric). Unlike nylon with grafted calcium acrylate, which has the same log R as unmodified nylon (i.e., 13.3), the calcium salt of styrene sulfonic acid-modified nylon gives a high level of antistatic properties; the log R is 9.5, with a high degree of wickability, a moisture regain of 8.01% (72% RH), high wet crease recovery, and excellent resistance to hole melting. The product is also resistant to oily soil, and once soiled, is easily cleaned.

When the test is repeated, it is found that a freshly prepared 25% SSA/SSS solution is as effective as the 35% solution used above.

The presence of inorganic salts such as $Na_2SO_4$, NaCl, LiCl, and the like in aqueous solutions of the unsaturated acids used for the impregnation and the grafting reaction usually increases the amount of acid grafted at constant irradiaton dose and acid concentration, as shown by the following example.

*Example XXX*

Three samples of 66 nylon fabric, coded SA, SB, and SC are soaked in 3 aqueous solutions containing 10% sodium styrene sulfonate and 0, 10, and 20% sodium sulfate, respectively. The samples are irradiated in solution with a dose of 1 mrep., using the Van de Graaff generator of Example I. After washing four times in 80° C. distilled water, the weight gains noted below are observed.

TABLE 23

| Sample | Percent $Na_2SO_4$ in 10 percent sodium styrene sulfonate treating solution | Percent weight gain |
|---|---|---|
| SA | 0 | 1.5 |
| SB | 10 | 9.7 |
| SC | 20 | 20.0 |

*Example XXXI*

This example illustrates the relation between wet crease recovery and amount of styrene sulfonic acid grafted to nylon, in the sodium and calcium salt forms.

Five nylon fabric samples, IA to IE, inclusive, have varying amounts of styrene sulfonic acid grafted thereon, following the procedure of Example XXIX. The sodium and calcium salts are formed, using the same techniques. These samples are tested for wet crease recovery, with the results shown in Table 24. An unmodified control, IF, is also included.

TABLE 24.—WET CREASE RECOVERY OF STYRENE SULFONIC ACID MODIFIED POLYAMIDE

| Sample | Acid grafted, weight percent | $-SO_3H$ groups per $10^6$ gm. | Wet crease recovery | |
|---|---|---|---|---|
| | | | Na form | Ca form |
| IA | 15 | 540 | 84 | 79 |
| IB | 18 | 640 | 90 | 85 |
| IC | 25 | 890 | 97 | 100 |
| ID | 27 | 960 | 97 | 100 |
| IE | 34 | 1,210 | 97 | 94 |
| IF (control) | 0 | None | 67 | |

*Example XXXII*

The acid-grafted polymer, and in many cases the salt-modified graft of the polymer of this invention is readily adaptable to a wide variety of after-treatments, whereby fiber and/or fabric properties may be permanently changed, as shown in this example.

A portion of nylon fabric is prepared by the procedure used for sample AF in Example V (a graft of 10% acrylic acid), followed by conversion to the sodium salt in dilute boiling $Na_2CO_3$ solution. The fabric is padded at a 60% weight pickup (wet) from an emulsion of (parts by weight):

5 parts "Elvanol" 50–42
  20 parts "Paraplex" G–62
 100 parts "Eponite" 100
   7 parts zinc fluoroborate
 680 parts water Excess liquid is then removed from the fabric while heated at 107° C. for 1 minute, at wet dimensions, followed by curing for 3.5 minutes at 163° C. at dry dimensions. The fabric is then neutralized in a 60° C. bath containing 0.5% $Na_2CO_3$ and 0.025% "Triton" X–100. The fabric is then rinsed and dried.

The "Eponite" epoxy resin cross-linked fabric is insoluble in formic acid, although the starting material (sodium salt of acid-modified polyamide) is soluble in formic acid. The treated fabric has superior wash-wear properties when subjected to an automatic washing machine washing and drying cycle. This improvement is obtained without appreciable change in fabric handle, unlike conventional application of this reagent to unmodified nylon.

It is thought that two factors contribute to the surprising results obtained here. Usual application of the epoxy resin to hydrophobic polymers results in a highly undesirable stiffening and harshness of the treated fabric. Treatment by the process disclosed herein is thought to be assisted by an open structure produced by the sodium-salt-reaction step (see Example XXXVI); modification thus proceeds throughout the bulk of the fiber. In addition, there are many reactive groups (e.g., —COOH) to which the additives may attach themselves.

The trade names of materials used in this example are identified as follows:

"Elvanol" 50–42—a high viscosity, 88% hydrolyzed polyvinyl alcohol

"Paraplex" G–52—a high molecular weight polyester plasticizer

"Eponite" 100—an aliphatic polyepoxide of 300–400 molecular weight, containing more than one epoxide group per molecule "Triton" X–100—an octyl phenyl polyether alcohol wetting agent

*Example XXXIII*

The efficiency of grafting normally solid unsaturated acid modifiers or their salts to shaped polymer substrates is improved by the use of a solvent having low volatility, as illustrated in this example.

A control sample is prepared by passing undrawn nylon yarn over a roll wetted with a solution of 20% sodium styrene sulfonate (SSS) in water to produce a bobbin of a yarn containing 11 grams of SSS/100 grams of nylon. Previous experiments indicate that the solubility of SSS in nylon is approximately 2.65 grams per 100 grams of the polymer. After 24 hour conditioning, the yarn is irradiated with 2 mev. electrons at a total dosage of 18 watt-sec./cm.$^2$ and is then scoured to remove ungrafted material. The yarn is found to contain 2.7 grams of grafted sodium styrene sulfonate per 100 grams of yarn, and to have a log R of 12.6.

The test sample is prepared by passing undrawn nylon yarn over a roll wetted with a solution of 16% sodium styrene sulfonate dissolved in ethylene glycol, to produce a bobbin of yarn containing 10.0 grams of SSS and 52.5 grams of ethylene glycol per 100 grams of nylon. After the same irradiation exposure as given to the control, the product is found to contain 5.0 grams of grafted SSS/100 grams of nylon, and to have a log R of 8.6.

The important features of this method of treatment are the use of a solution of an agent with low affinity for nylon, dissolved in a non-volatile solvent under conditions favoring attainment of equilibrium-absorption of monomer, to produce a yarn characterized by a modification throughout the yarn greater than the solubility of the monomer in nylon. This is attained by providing an environment of acid solution having a concentration appreciably higher than the limit of solubility in the polymer. This permits diffusion of monomer through the yarn surface during and after irradiation. Since the monomer is a crystalline solid, a solvent is required to maintain a liquid phase which, therefore, permits diffusion. A non-volatile solvent is used so that the yarn need not be immersed in the solution but rather can retain the solution as a surface film. This permits the treatment to take place on a compact cake of yarn where it would be difficult if not impossible to attain penetration from an externally supplied solution, and also makes it unnecessary to take any precautions to avoid solvent evaporation.

Example XXXIV

The product of this invention may be prepared by modifying flake polymer and thereafter forming filaments, as shown in this example. Nylon polymer flakes capable of passing through a 1/16 inch mesh screen are agitated for 140 hours in a solution of 30% acrylic acid. The flakes are then drained, and washed for 5 minutes in distilled water, followed by irradiation using the Van de Graaff electron generator at a potential of 2 million volts; an irradiation dose of 1 mrep. is employed. The flake with the acid grafted thereto is washed in distilled water, pulverized and vacuum dried. The dried flake is then dissolved in 30% aqueous formic acid at 55° C. and filtered. The acid-grafted polymer is then dry spun to form a 10 filament yarn.

The spun yarn is drawn using the apparatus of Hume, described in U.S. Patent 2,533,013; the hot pin is held at a temperature at 80° C. and the plate at a temperature of 180° C. The draw ratio is 3.8×, producing a 26 denier yarn. Analysis of the original grafted polymer shows 1460 carboxyl ends per million grams of polymer. The yarn has a tenacity of 3.1 grams per denier and an elongation of 23%. Fabric woven from the drawn yarn is treated with 0.5% sodium carbonate solution followed by a 15-minute boil-off. The wet fabric is very resilient and has a very good wet crease recovery as compared to an unmodified nylon control.

Melt-stable grafts or unsaturated acids and nitrogenous condensation polymer substrates may be melted and spun to produce useful textiles, as shown by the following example.

Example XXXV 66 nylon flake with a relative viscosity of 35 is cut to pass a 40 mesh screen and is then dried under vacuum. The powdered polymer is soaked in an aqueous solution containing 15% sodium styrene sulfonate, for a period of three days. The polymer is then irradiated with a dose of 1 mrep., according to the technique of Example I. It is extracted with boiling water, and dried under a vacuum; a weight gain of 5% is observed. The modified polymer is extruded using a ½ inch diameter screw extruder operating at a temperature of 285° C., and filaments are formed by passing the molten polymer through a 5 hole spinneret at a rate of about 1 gram per minute. The spun yarn is wound up at a speed of about 35 yards per minute. The spun yarn is subsequently drawn and woven into a fabric.

The fabric is boiled in dilute sodium carbonate solution to form the sodium salt; the modified fabric is resistant to hole melting, is wickable, and has antistatic properties.

The process of forming the salt of the acid-grafted polymer of this invention results, in many instances, in producing a profound change in the physical structure of fibers to which the acid has been grafted. The greatest changes are produced by the use of positive ions having high hydrophily. Sodium ion is the commonest of these. An opening of the fiber structure is thought to be produced by swelling caused by hydration of the sodium ion bound to the grafted acrylic acid. The open structure is not produced when the salt is initially formed, but when the fiber is boiled off, either in a sodium-ion-containing solution or in distilled water following the sodium ion treatment. The change is irreversible in that even after sodium ion is removed by acid treatment, regenerating the acid form, the structure remains open and porous. The open structure permits ready penetration of the fiber by dyes or other treating agents of large molecular size (e.g., resin finishing agents, antistatic agents, or the like). The formation of the open structure is accompanied by a setting of filaments by which a variety of interesting and useful effects are produced. The effects are illustrated by the following examples.

Example XXXVI

A series of nylon fabric samples are prepared in accordance with a scheme and treatments indicated in Table 25.

TABLE 25

| Sample | Processing |
| --- | --- |
| JA | Nylon fabric with 10% grafted acrylic acid (preparation like AF, Ex. V). |
| JB | Portion of sample JA, converted to Na salt by boiling in dilute Na₂CO₃. |
| JC | Sample JB, reconverted to the acid form by acetic acid treatment. |

Each of the three samples are divided into two portions, and are then dyed in the dye baths described in Table 27, with the results listed in Table 26.

TABLE 26

| Dye | Anthraquinone green GNN | | Du Pont Milling Red SWB | |
| --- | --- | --- | --- | --- |
| | Initial color | After washing | Initial color | After washing |
| JA | Light dyeing | Decreased color | Light dyeing | Little change. |
| JB | Deep dyeing | do | Deep dyeing | Do. |
| JC | do | do | do | Do. |

Although sample JC is chemically the same as sample JA, from the dyeing results it is obvious that important physical changes have been made in the structure of the fibers. It is thought that these changes are the result of an opening of the fiber structure, so that it is more easily penetrable by the dye molecules. The improved wash fastness observed with the Du Pont Milling Red as compared to the Anthraquinone Green is thought to be due to the fact that the red dye has a larger dye molecule and hence does not diffuse from the open structure as readily as the smaller green dye molecule.

When the experiment is repeated, starting with the calcium form of the acid-grafted polyamide and converting it to the sodium form followed by regenerating the calcium form, the regenerated calcium form has improved dyeability over the virgin calcium sample.

Examination of samples JA and JB by low angle X-rays indicates that the sodium form apparently contains more or larger voids within the fibers. Conversion to the calcium salt directly from the acid opens the structure less than conversion to the sodium salt. However, when the calcium salt is prepared via the sodium salt, the open structure is obtained.

The composition of the dye baths used in this experiment is indicated in Table 27. Both dyes are classed as acid dyes.

TABLE 27

| | Dyebath composition (per g. fabric) | |
| --- | --- | --- |
| Dye bath | 1 | 2 |
| Dye | Anthraquinone Green GNN | Du Pont Milling Red SWB |
| C. I. number | 1078 | 430. |
| Dye | 0.5 g | 0.05 g. |
| "Triton" X-100 (see Ex. XXXII) | 0.02 g | |
| "Duponol" D¹ | | 0.02 g. |
| Distilled water | 70 ml | 60 ml. |

¹ "Duponol" D is the sodium salt of unsaturated long-chain alcohol sulfate, a surface-active agent.

Both dye baths are adjusted to a pH of 4, using potassium acid phthalate buffer. A one-hour immersion is employed with bath No. 1 at 90 to 100° C.; for No. 2, dye at boil for 90 minutes.

Advantage can be taken of the fundamental physical changes caused by forming the sodium salt of the acid-grafted polyamide, for producing novel fabrics and yarns, as illustrated in the following example.

Example XXXVII

A sample of nylon fabric is prepared in accordance with the procedure of sample AF, Table 6, in Example V, thus bearing a 10% graft of acrylic acid. The fabric sample is ironed conventionally to make it wrinkle free, then a crease is ironed into it, followed by pouring on the fabric sample a 5% aqueous solution of sodium carbonate. The crease is then pressed into the fabric with a steam iron. The crease appears as though set into the fabric; it may be ironed out so that it is practically invisible while dry, but as soon as the fabric is wetted the crease immediately reappears.

A nylon stretch yarn is prepared by the following procedure. A 70 denier 34 filament nylon yarn is grafted with 10% acrylic acid, following the soaking and irradiation procedure of sample AF, Table 6, in Example V. The yarn is then knitted into tubing and is boiled in dilute sodium carbonate solution, which sets the stitch formation as the sodium salt is formed. The yarn is then backwound onto cones. On removal from the cone, the yarn is straight and uncrimped. Upon immersion in water, the yarn snaps into a crimp, and remains crimped on drying. A bulky and elastic fabric is formed when the yarn is converted to this form.

In another process variation, the acid-grafted 70 denier 34 filament yarn prepared as described above, is twisted 30 turns Z per inch, and is then boiled in dilute sodium carbonate solution, setting the twist in place while forming the sodium salt. The sample is then twisted in the reverse direction, and wound onto a package. The packaged yarn is substantially straight until it is immersed in water, thereby producing a highly crimped yarn.

The acid-grafted yarn may also be set by boiling in sodium ion solution prior to twisting, followed by twisting to 60 turns per inch. The twisted yarn is then twist-set by heating for 30 minutes at 82° C., 65% RH. The yarn is then woven into a fabric. After immersing the fabric in water, a crepe-like fabric is produced.

Example XXXVIII

This example illustrates the use of the acid-grafted polyamide product of the instant invention in forming a variety of useful modified fabrics by way of post-treatment.

Seventy denier 34 filament nylon yarn is soaked in 15% acrylic acid solution and irradiated according to the techniques used for sample AG in Example V. After washing to remove excess ungrafted polymer, it is found that the nylon yarn contains 13% grafted acrylic acid. The yarn is converted to the sodium salt by boiling in 0.5% sodium carbonate solution. The yarn is divided into portions, and is treated as follows.

A portion of the above yarn (in the sodium salt form) is boiled in a solution of 10% cadmium chloride, whereby ion exchange with the sodium takes place and the cadmium salt is formed. This yarn, after light rinsing is then boiled in a 30% solution of ammonium sulfide for 1 minute, whereby cadmium sulfide is precipitated within the yarn. The yarn has a bright yellow color, which is highly wash fast, light durable, and crock resistant.

Following this technique, colored nylon yarns are produced by precipitating other insoluble metal-ion salts within the fiber. Examples of such precipitates are ferric hydroxide, nickel dimethylglyoxime, mercuric sulfide, lead chromate, and the like.

A portion of the original yarn (in the sodium form) is treated by boiling in a 10% solution of barium chloride. The treated yarn is rinsed slightly, so that excess barium chloride solution is removed, and is then boiled in a 10% solution of sodium sulfate. A white precipitate of barium sulfate is formed within the fibers, giving them a highly delustered appearance.

A portion of the original yarn (in the sodium form) is soaked in a solution of 2% $NiCl_2$ at 80° C., whereby the sodium ion is replaced by nickel. The nickel-acrylate bearing yarn is then soaked, at room temperature, in 0.5% aqueous sodium borohydride ($NaBH_4$) for 1 hour. The nickel is thereby reduced, and the yarn becomes black. A portion of the yarn with reduced nickel is immersed in a chemical plating bath for 10 minutes at 76° C. The bath composition is as follows:

| | |
|---|---|
| $NiCl_2 \cdot 6H_2O$ | gm 5 |
| Dimethylformamide | ml 300 |
| Water | ml 200 |
| Dimethylamineborane | gm 2 |

After plating, the yarn sample is removed, scrubbed, scoured, and dried. The yarn is found to be a relatively good conductor of electricity.

The thickness of the reduced nicked deposit (prior to plating) may be increased by repeating the nickel chloride treatment, followed by reduction. This is made possible because the sodium acrylate salt is regenerated by the sodium ion from the initial treatment with $NaBH_4$. When this this is done, the conductivity of the fiber increases. The log R of the twice-treated yarn is less than 7.5. The process may be again repeated to further increase the amount of conductive nickel within the fiber, although higher conductivities are obtained via the chemical plating process.

Although any linear, high molecular weight, fiber- or film-forming, nitrogenous condensation polymer is suitable for preparing the product of this invention, polyamides are preferred. Suitable polyamides are those synthetic linear polyamides which are prepared from polymerizable monoamino monocarboxylic acids or their amide-forming derivatives, or from suitable diamine and suitable dicarboxylic acids or from amide-forming derivatives of these compounds. The preferred polyamides are those wherein the intracarbonamide linkages are other than exclusively aromatic, i.e., there is at least 1 aliphatic —HCR— group in each repeating unit of the polymer molecule. The —R— group may be hydrogen, halogen, monovalent organic radical, alkylene or the like. Typical of such polyamides are those formed from an aliphatic diamine and an aliphatic acid containing the repeating unit $$-X-Z-Y-Z-$$

wherein —X— and —Y— represent divalent aliphatic or cycloaliphatic groups and —Z— represents the $$\begin{array}{c} O\ H \\ -C-N- \end{array}$$

linkage. Polyhexamethyleneadipamide and caproamide (i.e., "66" and "6" nylons) are typical. Other suitable polyamides are those having the repeating structure $$-A-Z-X-Z-$$

wherein —A— is a divalent aromatic radical and —X— and —Z— are as previously defined. Polyhexamethylene terephthalamide is illustrative of such polymers. Additionally polyamides having repeating units such as $$-A-Z-B-Z-$$

and $$-X-Z-B-Z-$$

wherein —B— is divalent alkaryl (such as xylylene) may be used. Another class of suitable polyamides containing other than aromatic intracarbonamide repeating units are those prepared from piperazine, such as those from piperazine and adipic acid, piperazine and terephthalic acid, and the like. Copolyamides, condensation copolymers wherein the amide linkage is the predominant linkage and polyamide mixtures are also useful. As pointed out previously, such polyamides, to form the structures of the present invention, are of a high molecular weight (i.e., they are fiber-forming and have a non-tacky surface at room temperature). It is, of course, obvious that a polyamide, for example, will have more than the 300 carboxyl end concentration specified herein at an early stage of polymerization. However, as polymerization continues, —NH₂ and —COOH ends disappear to form amide linkages, and when the polymer has attained fiber-forming molecular weight, there are no longer sufficient "normal" carboxyl ends to provide the properties of the product of this invention. Thus, while, as pointed out by Carothers in U.S. 2,071,253, fiber-forming polyamides should have a number average molecular weight of about 10,000 (relative viscosity 24), the acid-bearing high molecular weight polyamide of the present invention must contain grafted acid groups, to total at least about 300 titratable acid groups per $10^6$ grams of polymer. Although a low molecular weight polyamide (in the 8,500 molecular weight range and with an inherent viscosity of 20) may be prepared with excess acid to provide a high carboxyl end content, such a polymer will only contain about 200 carboxyl end groups, and will not exhibit the unusual and highly beneficial properties of the structure of the present invention when the salt of the acid is formed.

Preparation of the high molecular weight polyamides is illustrated in United States Patent Nos. 2,071,250; 2,071,253; and 2,130,948. Preparation of polyurethanes is described in United States Patent Nos. 2,284,637 and 2,731,446; preparation of the polyureas is described in British Patent No. 535,139. Additional methods of preparation are described in United States Patent No. 2,708,617.

The shaped structure useful in forming the product of the present invention may be in any form such as a fiber, film, sponge, or pellicle. It may be in the form of a woven, knitted, or felted fabric, a paper, a bristle, or artificial straw. Alternatively, the structure may be a flake, powder, or comminuted particle, which may be reshaped after grafting to form an article of specific end use. The shape is not a critical element in the treatment, except that shapes of increased thickness require a proportionately greater time or high temperature or pressure for complete diffusion of the unsaturated organic acid to occur. If limited penetration is desired, or if the organic acid has been previously dispersed in the polymer matrix prior to irradiation, thickness of the shaped structure is not of importance in determining process details. It is merely sufficient that when irradiation is employed to effect grafting, it have enough penetration to activate the substrate at least to the maximum depth required to effect the desired grafting of acid to the shaped polymer.

By an "unsaturated organic acid" as used herein is meant any acid and/or anhydride which contains at least one reactive vinylene or acetylenic group. It is preferred that it be of relatively low molecular weight since it is desirable that the acid penetrate into the shaped article and low molecular weight acids more readily penetrate the polymer structures. Thus, acids with up to 8 carbon atoms are preferred. However, acids with as high as 20 carbons in chain length may be used in some instances to produce lesser effects. For maximum activation of the double bond it is desirable that it be in close proximity to the carboxyl group or any other activating functional group such as halogen, nitrile, phenyl or the like, which also appears to enhance the rate of penetration of the agent into the fiber. Suitable unsaturated monoacids are acrylic, methacrylic, ethyl-acrylic, crotonic, propiolic, and styrene carboxylic acids, for example. To produce a slightly different effect, as was described hereinabove, those unsaturated acids which are difunctional are highly useful. Examples of these are maleic, dichloromaleic, fumaric, butadiene dicarboxylic and itaconic acids. In addition to the acids, other derivatives such as acid chlorides, acid anhydrides, half acid esters, and half acid amides are also effective.

Any organic compound with aliphatic unsaturation, containing functional groups which are convertible to the acid form by hydrolysis (e.g., amides, esters, nitriles), oxidation (e.g., aldehydes or ketones) or the like is suitable. The unsaturated acid may also contain substituent groups which it may be desirable to attach to the polymer to confer other properties, such as enhanced static reduction, moisture repellance, dyeability, flameproofness, etc. The said substituent groups may also be introduced by copolymerizing suitable monomers with the unsaturated acid.

In addition to the unsaturated carboxylic acids, other acids are useful. Such acids are the sulfonic acids (e.g., styrene sulfonic acid, ethylene sulfonic acid), unsaturated alkyl or aralkyl acid phosphates, phosphites, phosphonates, phosphinates; acid alkyl sulfates and carbonates with unsaturated carbon-carbon bonds also have utility. Substituted acid phosphinate derivatives have especial utility because they also improve oxidation resistance. The acids may often be grafted as their preformed metal salts.

Mixtures of unsaturated acids as well as the penetration and grafting of one acid followed by the penetration and grafting of other acids are obvious technique modifications.

If the unsaturated acid is stable at the polymer melting temperature, it may be added to the melt before shaping. Alternatively, it can be added to a polymer solution, and shaping may then take place by wet or dry spinning; the shaped filament may then be irradiated to induce grafting. Alternatively, a polyamide, for example, with the unsaturated acid grafted thereto (e.g., in flake form) may be (1) melt spun, or (2) dissolved in formic acid and spun into a bath containing dilute sodium hydroxide, thus forming the filament and carrying out the acid-salt-derivative formation (presumably a type of ionic cross-linking) in one operation.

The product of this invention is of the type known as a graft copolymer. Conventional copolymers, consisting of monomer species A and B, have a random distribution along the backbone of the polymer molecule, and may be represented schematically thus:

—AAABBABBBABAA—

The graft copolymer species with which this invention is concerned, consists of a main chain of polymer A, and side chains of polymer B grafted thereto, represented below:

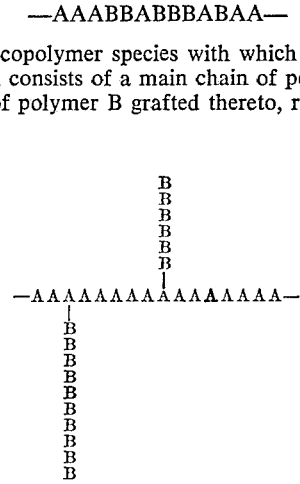

The characteristic of this copolymer type is that its gross properties remain predominantly those of the polymer (A) forming the molecular backbone. However, modifications can be produced via polymer (B) grafts, in most cases, without loss of the original desirable properties. As an example, conventional copolymers usually have a lower melting point than those of either component, while graft copolymers usually retain the high melting point of the pure backbone component. The structure and preparation of some examples of these copolymer types is discussed in a comprehensive review article by E. H. Immergut and H. Mark in Macromolekulare Chimie 18/19, 322–341 (1956).

A study of the free radicals formed when poly(hexamethylene adipamide) is irradiated, has shown that hydrogen is removed from one of the carbons in the polymer chain, forming a free radical. Paramagnetic resonance studies indicate that the predominant free radical has the structure:

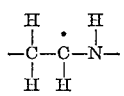

The formation of lesser numbers of free radical sites on other carbon atoms in the polymer chain have been indicated. No evidence has been uncovered which indicates the formation of a free radical and subsequent grafting via the nitrogen atom or the carbonyl group. Thus, after irradiation of 1010 polyamide prepared from sebacic acid and decamethylene diamine which is completely deuterated in the position alpha to nitrogen, paramagnetic resonance studies indicate that a free radical is formed by elimination of D from the alpha carbon. The use of paramagnetic resonance spectra to study free radicals is reviewed by G. F. Fraenkel in Annals of the New York Academy of Science, 67, 546 (1957, May).

Once free radicals are produced on the carbon atoms of the polymer chain, vinyl polymerization is initiated, and polyvinyl chains grow from the initiating site. In general, the usual kinetics of vinyl polymerization control reaction rate, and thus the length and number of grafted chains; by control of the number and length of grafted chains, the effect produced by a given grafting agent may be modified.

Because the polymer is penetrated with an unsaturated organic acid prior to initiating the graft polymerization, modification of the shaped structure extends at least through a substantial proportion of the body of the final product. Usually the acid is coated upon the shaped polymer, or padded on as a dispersion, a solution, a pure liquid or as an emulsion. For liquids, spraying is useful, or the polymeric article may be dipped therein. The acid may be added as a vapor. The preferred method is to dip the shaped polymer into a solution which contains the polymerizable composition.

When employing polyamides, the penetration is facilitated by an affinity of polyamide for unsaturated acid. Thus, when nylon fabric is treated with acrylic acid solution and excess liquid is mechanically removed, there is substantially more acid left in the wetted nylon than expected. Thus, mechanically removing liquid acid before polymerization initiation increases efficiency by decreasing loss of acid due to homopolymerization of the excess acid outside of the filament.

Increased contact time and agitation are helpful in increasing penetration. It is sometimes beneficial to carry out the soaking for penetration at elevated temperatures (below that at which polymerization is initiated), at superatmospheric pressure or in the presence of swelling agents, dye carriers, or the like. However, elevated temperatures are to be avoided when using strongly acid modifiers like styrene sulfonic acid with hydrolysis-susceptible polymers such as nylon. Minor amounts of wetting agents, surface active compounds, and the like are useful for improving penetration efficiency.

When it is desirable to limit penetration of the polymerizable composition to a zone near the fiber surface, this may be accomplished by reduced contact time or temperature (before polymerizing), use of acids with greater chain length, or by using a lower concentration of the unsaturated acid. Alternatively, the shaped substrate may be exposed to the polymerizable composition for the time required to effect the desired penetration, then penetration may be stopped by freezing, for example, by exposure to Dry Ice. The combination may then be irradiated while frozen.

Where the acidic unsaturated monomer is applied from a solution, water is usually the preferred solvent. Other inert liquids are suitable for this purpose, however, such as alcohol, benzene, toluene, glycol, high boiling ethers and the like; the advantage of a non-volatile solvent is shown in Example XXXIII.

Due to the attachment of the unsaturated acid, the polyamide becomes highly receptive to basic dyes. Cross sections of acid treated, grafted nylon filaments dyed with basic dyes show deep dyeing throughout the fiber, proving that the acid has penetrated into and grafted onto the fiber.

When experimental conditions are adjusted so that complete penetration does not occur, microscopic examination of the dyed filament cross section shows a sharply defined ring which clearly defines the depth of penetration. For some purposes limited penetration is desirable. As an example, due to its high moisture regain nylon modified throughout its cross section with the sodium salt of acrylic acid may produce a cold, clammy effect to touch. This is satisfactory for fabrics which must be resistant to flash heat. However, to avoid a "cold" feel for intimate apparel uses, it may be desirable to limit penetration to about 10% (measured on the fiber radius) or in some cases, to as low as 5% penetration of fine denier filaments. Thus, for 1 denier per filament nylon yarns, the fiber diameter is about 11 microns; satisfactory penetration, for purposes such as those mentioned above, is therefore about 0.3 micron. Similar considerations apply for more massive substrates, such as, for example, heavy denier yarns, monofils, bristles, films, and molded objects. Penetration (and grafting) to a depth of about 0.3 micron (measured normal to the surface) produces useful and durable modification of certain polymer properties, such as for example antistatic effect. In the zone of penetration, the acid end concentration is, as required, at least about $300/10^6$ gm. polymer. In cases of partial penetration, however, the $10^6$ gm. of polymer refers only to the penetration zone, and not to the non-penetrated core. Results obtained by analysis of the entire filament must be corrected for the respective content of penetrated and non-penetrated fiber, which may be determined by measurement of the cross section of the dyed filaments.

It is possible to obtain useful modification of properties by a one-step treatment of the polymer using a preformed salt of an unsaturated organic acid, e.g., potassium acrylate or sodium styrene sulfonate, followed by irradiation to induce grafting. As previously discussed, due to slow penetration of the fiber, this method appears to be especially useful when it is desirable to limit the extent of fiber penetration.

In the final step of the process, i.e., formation of the salt of the acid, the positive ions apparently form the salt of the acid which has been previously grafted onto the polymer, thereby forming an ionic network which imparts the unusual and unexpected properties to the polymer, as described herein. Many of these properties are those which are typical of a cross-linked polymer. For example, sodium acrylate modified polyamide is substantially insoluble in hot m-cresol, a solvent for unmodified polyamide. Unlike conventionally cross-linked polyamides, however, the sodium acrylate-modified polyamide remains substantially soluble in 90% formic acid. By conventionally cross-linked polyamide, of course, is meant polyamide exposed to long periods of heating (in the melt), to high temperature oxidation, or polyamide polymerized in the presence of polyfunctional acids or amines, or polyamide exposed to extremely high doses of irradiation.

Any salt can be formed by simple treatment in aqueous solution, as already disclosed. Calcium ion is very readily picked up by the acid-modified polymer. If two or more cations are present in the treating solution, one ion will usually be picked up in preference to the other. For example, when both sodium and calcium ions are present, the calcium salt will be formed in preference to the sodium. This is readily controlled by treating the acid-modified polymer with a solution in which calcium ion sequestrant (e.g., sodium hexametaphosphate) is included. Under those conditions of treatment, sodium ion is picked up in preference to the calcium ion. When lithium ion is substituted as the cation for sodium, then similar hydrophilic and heat resistant properties are obtained. It may at times be desirable to treat the acid-modified polymer simultaneously or consecutively with more than one species of ion to obtain multiple effects. For example, since calcium ion is very effective in improving heat resistance, after incorporating this ion throughout the body of a shaped structure, sodium ions may be attached at or near the surface (using calcium sequestrant and sodium ion) to improve the antistatic characteristics.

Among metallic salts suitable for use in the process of the present invention may be mentioned sodium carbonate, potassium carbonate, potassium acetate, calcium acetate, manganous acetate, zinc acetate, cupric acetate, cobaltous acetate, chromic acetate, lanthanum acetate and and the like. Phosphate containing detergents such as "Tide" and even some hard waters are suitable as cation donors. Surprisingly, certain cations have specific effects on the light durability of dyes used on the acid-grafted polymer substrate. For example, nylon bearing calcium or magnesium salts of grafted acrylic acid, and dyed with Anthraquinone Green (Example XXXVI) is greatly improved in dye lightfastness. Similar but lesser effects are obtained with manganese and zinc salts.

The replacement of one positive ion by another on the acid-modified polymer of this invention follows the usual mechanisms of ion-exchange resins; similar concentration effects are observed. This subject is treated in detail by O. H. Osborn in "Synthetic Ion Exchangers" (Macmillan Publishing Co., 1956). If desired, ion exchange may be repressed or prevented by treating the acid-grafted polymer with a complex ion (Example XVIII), or in some cases, producing a coordination compound after treatment, as in Example XVII. Ion-exchange capacity is enhanced by grafting larger amounts of the acid, for example, by repeating the soaking in acid plus irradiation. Loadings of 100 to 200% are beneficial.

When the acid-grafted polymer is treated with positive ions, especially sodium, physical changes are produced which remain, for example, after regeneration of the acid form. The effect of these changes is to produce a more open structure, which is much more permeable to dispersed dyes and other treating agents, as disclosed hereinabove. These structure changes permit preparation of fabrics having a high degree of crease retention, wet crease recovery and freedom from soil; stretch yarns with good crimp retention may be made.

In addition to the above, the salt of the acid-grafted product of this invention is readily dyeable to deep shades, not only with basic dyes, but surprisingly, with disperse, acid, vat and direct dyes. In general, only light shades are obtainable with acid, vat and direct dyes on unmodified nylon. Improved leveling and more rapid dyeing (due to the open structure) are also attained.

Organic cations are suitable for forming the salt of the acid-modified polyamide. Any amine or quaternary ammonium compound may be employed. Among these may be mentioned ammonia, aliphatic, aromatic, cycloaliphatic and heterocyclic amines such as ethylamine, diethylamine, triethylamine, triethanolamine, guanidine, aniline, benzylamine, cyclohexylamine, piperidine, morpholine, and the like. So also the nature of the quaternary ammonium ion used in salt formation is not critical. Methylpyridinium chloride, trimethylbenzylammonium chloride, tetramethyl ammonium chloride, and the like may be used. Polyquaternary compounds are also useful when sufficient penetration is obtainable.

Shaped structures of the present invention, when in the form of fabric, have been described herein primarily in terms of increased resistance to hole-melting. However, in addition to these effects, such fabrics show increased resistance to flash heat, higher zero strength temperature (from 240° to 365° C. in the case of Example I), and a high and unexpected degree of elasticity and deformability at high temperatures (e.g., above 185° C.). Because of this deformability, a polyamide fabric of the present invention may be given three-dimensional shape at high temperatures (e.g., by forming or embossing), which shape is retained on cooling. The shape is retained without substantial fusing of the individual filaments and without deleterious effect on the fabric hand. When reheated above about 185° C., the fabric returns substantially to its original shape. Furthermore, yarns of the salts of acid-modified polyamide may be elongated (drawn) at temperatures of 185° C. or above.

Upon heating a shaped structure (such as a fiber or fabric) produced from the salt of the acid-modified polymer of the present invention under relaxed conditions to temperatures of 185° C. to 200° C. or above, a shrinkage of 50% or more is observed. Such shrinkage is in addition to that which removes earlier post-deformations. Furthermore, it permits textured effects when yarns of modified and unmodified polymer are combined in the same fabric, or when the unsaturated acid or the cations are applied in a pattern (i.e., non-uniformly), or indeed when portions of the shaped substrate are shielded during the irradiation-drafting of the unsaturated acid to the polymer.

It has also been found that in some cases the elastic modulus (at 25° C.) of fibers, yarns, etc., produced from the salt of the acid-modified polymer of the present invention is substantially increased, especially when the structure is held under tension during the grafting operation.

In the form of fabric, the novel product of this invention has other very important new properties, hitherto unattainable. For example, fabrics to which unsaturated acid has been grafted, followed by formation of the sodium salt, thereby attain a new degree of crease recovery (as much as 30 to 40% improvement) under conditions of high relative humidity. Thus, fabrics treated according to the process of this invention, after becoming wrinkled through use, can be brought back to their original wrinkle-free appearance by merely wetting and hanging up to dry. Ironing is not necessary.

The product of this invention is also useful in making paper of high tear strength. For example, paper made from ¼" nylon staple having 10% grafted sodium acrylate, and bonded with polybutadiene, polyacrylonitrile, or neoprene latex, shows 150 to 250% greater tear strength than similar paper from unmodified nylon.

It should be understood that the polymeric articles, treated in accord with the process of this invention, may contain the usual amounts of delusterants, antioxidants, and the like, whereby improved appearance, light stability, heat durability, and the like are obtained.

This application is a continuation-in-part of United States application No. 595,210, filed July 2, 1956, which is a continuation-in-part of U.S. Serial No. 573,061 and 573,062 each filed March 16, 1956, these in turn being continuations-in-part of United States application No. 499,754, filed April 6, 1955, and United States application No. 503,790, filed April 24, 1955, all now abandoned.

Many equivalent modifications will be apparent to those skilled in the art from a reading of the above without a departure from the inventive concept.

What is claimed is:

1. A graft copolymer substantially insoluble in water comprising a synthetic high molecular weight substantially linear nitrogenous condensation polymer characterized by recurring $$-\overset{|}{N}-$$

atoms as an integral part of the polymer chain, the said linear nitrogenous condensation polymer bearing at least about 300 titratable acid groups per million grams of polymer, at least about 200 of the said acid groups being chemically bonded by a carbon to carbon linkage to a catenarian carbon of the said nitrogenous condensation polymer and the said acid so linked being at least one carbon atom removed from said catenarian carbon.

2. The graft copolymer of claim 1 wherein the nitrogenous condensation polymer is polyhexamethylene adipamide.

3. The graft copolymer of claim 1 wherein the nitrogenous condensation polymer is polycaproamide.

4. The graft copolymer of claim 1 wherein the said acid groups chemically bonded to catenarian carbon are derived by a free radical initiated reaction at the graft site from maleic acid.

5. The graft copolymer of claim 1 wherein the said acid groups chemically bonded to catenarian carbon are derived by a free radical initiated reaction at the graft site from acrylic acid.

6. The graft copolymer of claim 1 wherein the said acid groups chemically bonded to catenarian carbon are derived by a free radical initiated reaction at the graft site from styrene sulfonic acid.

7. A graft copolymer substantially insoluble in water comprising a synthetic high molecular weight substantially linear nitrogenous condensation polymer characterized by recurring

atoms as an integral part of the polymer chain, the said linear nitrogenous condensation polymer bearing in the form of a salt of an organic acid at least about 300 titratable acid groups per million grams of polymer, at least about 200 of the said acid groups being chemically bonded by a carbon to carbon linkage to a catenarian carbon of the said nitrogenous condensation polymer and the said acid so linked being at least one carbon atom removed from said catenarian carbon.

8. The graft copolymer of claim 7 wherein the nitrogenous condensation polymer is polyhexamethylene adipamide.

9. The graft copolymer of claim 7 wherein the nitrogenous condensation polymer is polycaproamide.

10. The graft copolymer of claim 7 wherein the said acid groups chemically bonded to catenarian carbon are derived by a free radical initiated reaction at the graft site from acrylic acid.

11. The graft copolymer of claim 7 wherein the said acid groups chemically bonded to catenarian carbon are derived by a free radical initiated reaction at the graft site from styrene sulfonic acid.

12. The graft copolymer of claim 7 wherein the salt is the sodium salt.

13. The graft copolymer of claim 7 wherein the salt is the calcium salt.

14. A filament of the graft copolymer of claim 1.

15. A film of the graft copolymer of claim 1.

16. A fabric resistant to hole melting, formed of the calcium salt of the graft copolymer of claim 1 wherein the said nitrogenous condensation polymer is high molecular weight poly(hexamethylene adipamide).

17. A fabric of relatively low static acquisition and retention characteristics, formed of the sodium salt of the graft copolymer of claim 1 wherein the said nitrogenous condensation polymer is high molecular weight poly(hexamethylene adipamide).

18. A graft copolymer substantially insoluble in water from the class consisting of (a) a synthetic high molecular weight substantially linear nitrogenous condensation polymer characterized by recurring

atoms as an integral part of the polymer chain, the said linear nitrogenous condensation polymer bearing at least about 300 titratable acid groups per million grams of polymer, at least about 200 of the said acid groups being chemically bonded by a carbon to carbon linkage to a catenarian carbon of the said nitrogenous condensation polymer and the said acid so linked being at least one carbon atom removed from said catenarian carbon and (b) the said nitrogenous condensation polymer as recited above wherein the titratable acid groups are in the form of a salt.

19. A foam of the graft copolymer of claim 18.

20. The graft copolymer of claim 18 in which the said nitrogenous condensation polymer is a linear polycarbonamide characterized by recurring carbonamide linkages as an integral part of the polymer chain.

References Cited in the file of this patent

FOREIGN PATENTS 679,562   Great Britain _____ Sept. 17, 1952

OTHER REFERENCES

Hanly et al.: J. of the Chemical Soc. (London), November 1950, pp. 3239 to 3249.

Hicks et al.: Nature, vol. 171, page 300 (1953).

Seitzer et al.: J. Am. Chem. Soc., vol. 75, pages 755–6 (1953).